(12) United States Patent
Murao et al.

(10) Patent No.: US 7,420,538 B2
(45) Date of Patent: Sep. 2, 2008

(54) LIQUID CRYSTAL DISPLAY DEVICE AND DRIVING DEVICE THEREOF, AND METHOD FOR DRIVING LIQUID CRYSTAL DISPLAY DEVICE

(75) Inventors: Masayuki Murao, Tsu (JP); Hidetaka Mizumaki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 602 days.

(21) Appl. No.: 11/000,210

(22) Filed: Dec. 1, 2004

(65) Prior Publication Data
US 2005/0122305 A1    Jun. 9, 2005

(30) Foreign Application Priority Data
Dec. 3, 2003   (JP)   ............... 2003-404912
Jan. 27, 2004   (JP)   ............... 2004-018612

(51) Int. Cl.
*G09G 3/36*   (2006.01)
*G02F 1/133*   (2006.01)

(52) U.S. Cl. ............... 345/101; 345/84; 345/87; 345/89; 345/98; 345/100; 349/56; 349/72

(58) Field of Classification Search ............ 345/55, 345/84, 87, 89, 98, 100, 101; 349/56, 72
See application file for complete search history.

(56) References Cited
U.S. PATENT DOCUMENTS 4,923,285 A  *  5/1990  Ogino et al. ............... 345/101
5,359,342 A     10/1994  Nakai et al.
5,717,421 A  *  2/1998  Katakura et al. ............ 345/101

(Continued)

FOREIGN PATENT DOCUMENTS
JP    63-25556 B2    5/1988

(Continued)

OTHER PUBLICATIONS
Mano et al., "R&D for Non-Contact Thermo Sensor Using Infrared Light", Shizuoka Prefecture Fuji Industrial Research Institute, Feb. 14, 2003.

*Primary Examiner*—My-Chau T Tran
(74) *Attorney, Agent, or Firm*—Harness, Dickey & Pierce, P.L.C.

(57) ABSTRACT

A liquid crystal display device of the present invention includes (i) a temperature sensor provided in at least one of pixels in a displaying area of a display panel, (ii) a lead line buried in the display panel, for transmitting a detection signal from the temperature sensor to a vicinity of the display panel, (iii) a temperature measurement control section for measuring a pixel temperature based on the detection signal transmitted from the temperature sensor, (iv) a data signal line driving section for outputting the data signal to the data signal lines in accordance with the pixel temperature measured in the temperature measurement control section. Further, the liquid crystal display device of the present invention includes (i) a plurality of data generating sections for generating data signals of the different output levels based on an inputted video signal and a video signal that is at least one frame earlier than the inputted video signal, (ii) a data generating section containing section for containing therein the plurality of the data generating sections, and (iii) a memory for use in selecting one of the data generating sections on a line-by-line basis for the respective scan signal lines.

13 Claims, 18 Drawing Sheets

U.S. PATENT DOCUMENTS

| | | | |
|---|---|---|---|
| 5,754,154 A | 5/1998 | Katakura et al. | |
| 5,903,251 A * | 5/1999 | Mori et al. | 345/101 |
| 6,414,740 B1 | 7/2002 | Hosoyamada | |
| 2002/0047821 A1 | 4/2002 | Miyake | |
| 2004/0201564 A1 | 10/2004 | Sugino et al. | |
| 2004/0263495 A1 | 12/2004 | Sugino et al. | |

FOREIGN PATENT DOCUMENTS

| | | |
|---|---|---|
| JP | 63-148781 A | 6/1988 |
| JP | 3-18822 A | 1/1991 |
| JP | 03-18823 A | 1/1991 |
| JP | 4-318516 A | 11/1992 |
| JP | 6-347759 A | 12/1994 |
| JP | 08-029265 A | 2/1996 |
| JP | 2507713 B2 | 4/1996 |
| JP | 09-021993 A | 1/1997 |
| JP | 9-269479 A | 10/1997 |
| JP | 2000-81607 A | 3/2000 |
| JP | 2000-338518 A | 12/2000 |
| JP | 2001-100685 A | 4/2001 |
| JP | 2002-62850 A | 2/2002 |
| JP | 2002-311416 A | 10/2002 |
| JP | 2004-151672 A | 5/2004 |
| JP | 2004-226470 A | 8/2004 |

* cited by examiner

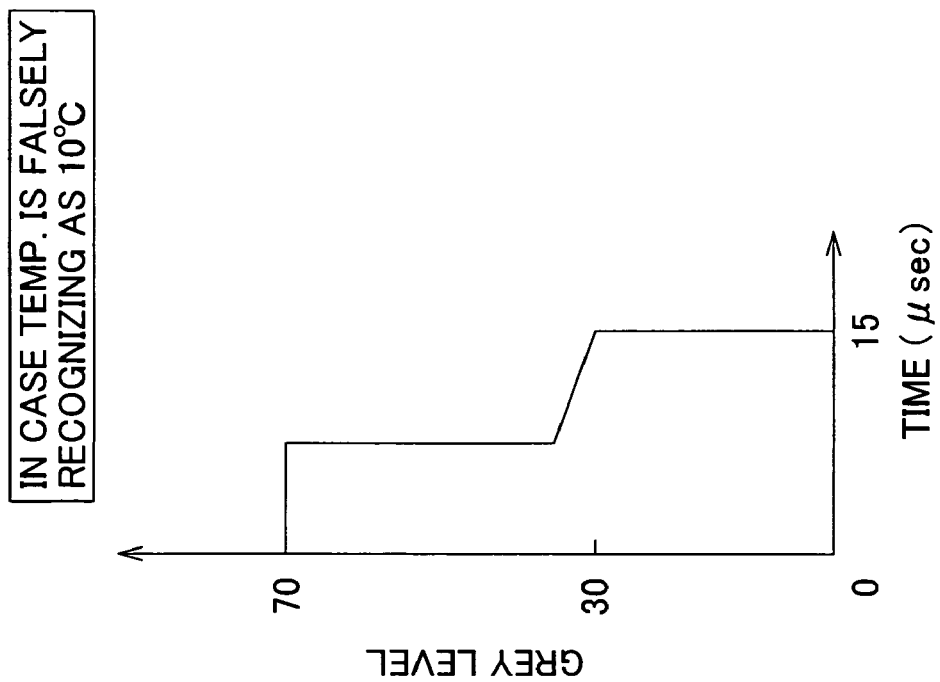
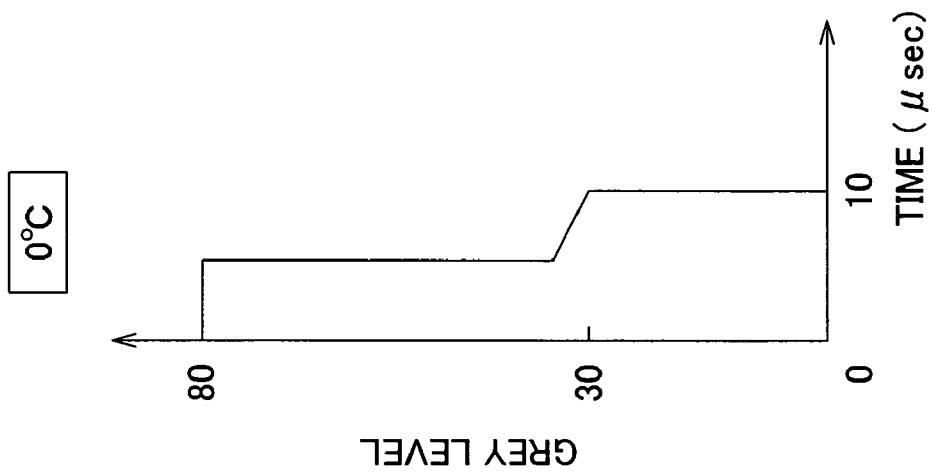
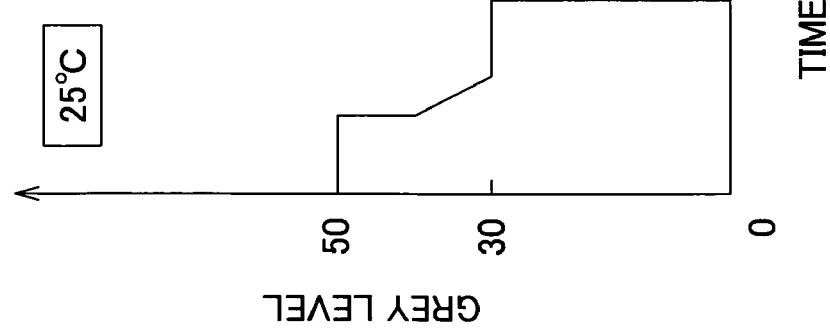

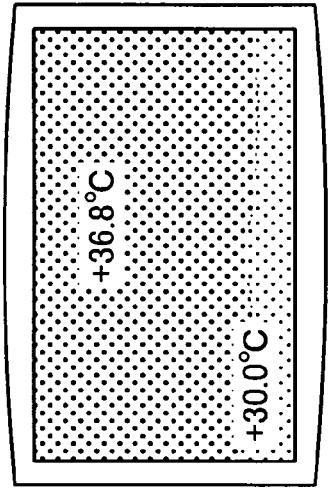
FIG. 7 (b) AFTER 60 MIN.
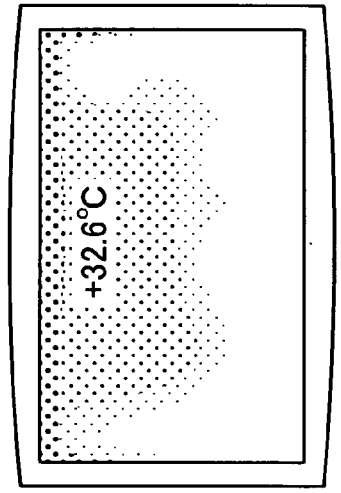
FIG. 7 (d) 30 MIN. AFTER POWER IS TURNED OFF
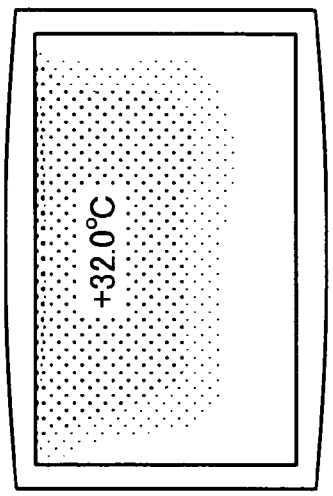
FIG. 7 (a) 30 MIN. AFTER POWER IS TURNED ON
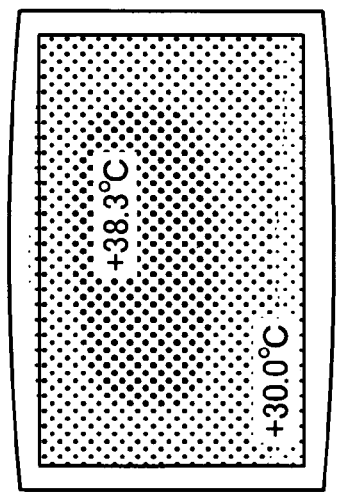
FIG. 7 (c) SATURATED STATE AFTER 90 MIN.

FIG. 15

| SCAN SIGNAL LINE NUMBER | TEMPERATURE t(°C) | OPTION OF DATA GENERATING SECTION |
|---|---|---|
| 1 | 38≦t | 0 |
| | 36≦t<38 | 1 |
| | 34≦t<36 | 2 |
| | 32≦t<34 | 3 |
| | t<32 | 4 |
| 2 | 38≦t | 0 |
| | 36≦t<38 | 1 |
| | 34≦t<36 | 2 |
| | 32≦t<34 | 3 |
| | t<32 | 4 |
| ⋮ | ⋮ | ⋮ |
| N | 38≦t | 0 |
| | 36≦t<38 | 1 |
| | 34≦t<36 | 2 |
| | 32≦t<34 | 3 |
| | t<32 | 4 |

…

LIQUID CRYSTAL DISPLAY DEVICE AND DRIVING DEVICE THEREOF, AND METHOD FOR DRIVING LIQUID CRYSTAL DISPLAY DEVICE

This Nonprovisional application claims priority under 35 U.S.C. § 119(a) on Patent Applications No. 2003/404912 filed in Japan on Dec. 3, 2003, and No. 18612/2004 filed in Japan on Jan. 27, 2004, the entire contents of which are hereby incorporated by reference.

FIELD OF THE INVENTION

The present invention relates to a liquid crystal display device adopting a matrix type display section having a displaying element whose temperature dependency is large. The present invention also relates to a driving device for the liquid crystal display device, and a method for driving the liquid crystal display device.

BACKGROUND OF THE INVENTION

A liquid crystal display device has been used as a display device for a computer. In recent years, such liquid crystal display device comes into increasing use for displaying a moving picture. This is because (i) use of the liquid crystal display device as a television has been developed as a result of development of a larger liquid crystal display device, and (ii) it becomes possible to process moving picture on computer as a result of improvement in performance thereof.

The liquid crystal display device has such characteristics that (i) it is free from screen flicker, (ii) it can have a thin thickness; (iii) it has low power consumption; (iv) and so on. Due to these characteristics, the liquid crystal display device has been attracting attentions as a device that applicable to a television and the like in replacement of prevailing CRT (Cathode-Ray Tube) display devices.

In the liquid crystal display device, a slow response speed becomes a big problem in displaying the moving picture on a liquid crystal module. More specifically, when the moving picture is displayed on the liquid crystal display device whose response speed is slow, after-image appear on the screen, thus causing ghosting of the moving picture. This causes deterioration in displaying quality. In the liquid crystal display device, the response speed from an intermediate graduation to an intermediate graduation is slower than response speed from black to white. Therefore the liquid crystal display device cannot display natural-color moving pictures without significant deterioration in display quality in some frames.

For example, Japanese Publication Examined Patent application Publication No. 25556/1988 (Tokukoushou 63-25556; published on May 25, 1988) discloses a method for improving the foregoing problem of the slow response speed of liquid crystal. The method disclosed in the above publication adopts a method called overshooting or overdriving. In these driving methods, a change greater than a change instructed in the input data is applied to a liquid crystal module, thereby improving the response speed.

In the liquid crystal display device, temperature within a liquid crystal panel is largely affected by environment temperature surrounding the liquid crystal panel. Further, during the display operation, various parts of the liquid crystal panel have various temperatures. Accordingly, in order to improve the response speed appropriately, it is necessary to apply to the liquid crystal panel such a change that is, to an extent required by the temperature within the liquid crystal panel, greater than the change instructed by the input data. if the response speed is not improved as such, deterioration in the displaying quality occurs while the moving picture is displayed.

In order to solve the foregoing problem, for example Japanese Patent No. 2507713 (issued on Jun. 19, 1996) discloses a liquid crystal display device conventionally including temperature sensors Th1 to Th8 mounted along edges of a liquid crystal panel 101 as shown in FIG. 16. By using these temperature sensors Th1 to Th8, temperature of the liquid crystal panel 101 is measured. Then, voltage impressed to anti-ferroelectric liquid crystal (AFLC) is changed in accordance with the measured temperature, so as to correct overall temperature-caused fluctuation in brightness of the liquid crystal panel 101.

More specifically, for example, changes in the temperature in the liquid crystal panel of the liquid crystal display device are compensated for by the following methods. Namely, in one of the methods, temperatures at edges of the liquid crystal panel 101 is measured, and an average temperature is calculated based on the temperatures measured. Then, the temperature of the liquid crystal panel 101 is estimated based on the average temperature, and pulse widths of scan voltage and signal voltage are changed in accordance with the temperature thus estimated, thereby causing response characteristic of the liquid crystal panel to correspond with the changes in the temperature. In another method, the liquid crystal liquid panel 101 is divided into four regions as shown in FIG. 17. Then the temperatures at the edges of the liquid crystal panel 101 are measured, and respective temperature distributions in the four regions are estimated based on the temperatures measured. Then, the pulse widths of the scan voltage and the signal voltage are changed in accordance with the temperature distributions thus estimated, thereby causing the response characteristic of the liquid crystal panel to correspond with the changes in the temperature.

As described, in the foregoing liquid crystal display device, the temperatures of a displaying surface of the liquid crystal panel 101 is estimated based on the temperatures measured at the edges of the liquid crystal panel 101. Then, respectively in accordance with the temperatures estimated, the correction is carried out in the four regions. This method, however, does no more than rough correction in response to the changes in the temperature by referring to the estimated temperature of the liquid crystal panel based on the temperatures at the edges of the liquid crystal panel. Therefore, even by the arrangement in which the liquid crystal panel is divided into the four regions, there still remains a problem that it is impossible to accurately compensate a driving voltage for the actual temperature changes in the four regions.

In order to solve the foregoing problem, Japanese Laid-Open Patent Application publication No. 81607/2000(Tokukai 2000-81607; published on Mar. 21, 2000) discloses a liquid crystal display device including (i) temperature sensors 202a to 202d provided at the edges of a liquid crystal panel 201, and (ii) at least one temperature sensor 203 for measuring temperature of a display region in the liquid crystal panel 201. In the foregoing liquid crystal display device, temperatures in respective predetermined pixel regions in the liquid crystal panel 201 are estimated based on temperatures measured by the temperature sensor 203 and the temperature sensors 202a to 202d. Then, for the predetermined respective pixel regions, actual intensities of image data signals are corrected in accordance with the estimated temperatures of each of the predetermined pixel regions, so that the actual intensities respectively become target intensities that are set for prescribed temperatures of the liquid crystal display panel 201. Then, in accordance with the image data signals thus corrected, signal voltage is generated.

As described, by providing at least one temperature sensor 203 in the display region in the liquid crystal panel 201, the brightness of the liquid crystal panel 201 is corrected individually with respect to each of the predetermined pixel regions. As such, even if there is fluctuation in temperature distribution in the liquid crystal panel 201, it is possible to constantly maintain a good brightness of an entire displaying surface of the liquid crystal panel 201 at the predetermined temperature. As a result, in the foregoing liquid crystal display device, the image data signal for the liquid crystal panel can be controlled, regardless of whether or not there is a change in the temperature of the displaying surface of the liquid crystal panel.

However, in the liquid crystal display device disclosed in the foregoing Tokukai 2000-81607, it appears that the temperature sensor 203 at a center of the liquid crystal panel 201 is actually a thermoelectric couple provided at a back side of the liquid crystal panel. This is because the thermo sensor 203 cannot be provided on a surface of the liquid crystal panel 201 lest image displaying be disturbed by the thermo sensor 203 provided on the surface.

Since actual temperature of a displaying element is not measured in the foregoing Tokukai 2000-81607 either, it is only possible that the pulse widths of the scan voltage and the signal voltage are changed in accordance with an approximate temperature estimated based on the estimated temperature.

In overshoot method, because the response speeds for respective pixels are improved, it is important for the control of the correction voltage to keep the liquid crystal elements within a specific temperature range. Therefore, the aforementioned drawback is an important problem in the overshoot method.

Furthermore, Japanese Unexamined Patent Application, Publication No. 4-318516/1992 (Tokukaihei 4-318516; published on Nov. 10, 1992) discloses a technology in which a temperature of a liquid crystal panel is measured, and data signals are emphasized in accordance with the temperature measured.

However, the response speed of the liquid crystal largely depends on temperature of the liquid crystal itself, and the response speed becomes dramatically slow at a low temperature of the liquid crystal. Further, more-than-necessary overshooting causes the liquid crystal to respond more than necessary. Such more-than-necessary response causes a displayed image to look unnatural. For this reason, it is necessary to adjust output level of the overshooting in accordance with the temperature of the liquid crystal.

Thus, gradation correcting data corresponding with a plural degrees of temperature are necessary for the liquid crystal display device. Further, alongside the development of larger liquid crystal display devices in recent years, the problem of the liquid crystal temperature unevenness (unevenness in the temperature of the liquid crystal) in the displaying section is becoming increasingly important. Conventionally, in the overshoot method for liquid crystal display devices, the output levels of the overshooting are adjusted, in group or as a whole, based on the temperatures at the edges of the liquid crystal panel, without considering the individual pixels. Especially, there is no attempt to perform correction to compensate for the temperature unevenness in the display region.

Furthermore, it is preferable that the liquid crystal display device be such that the line of the scan signal wiring are driven on a line-by line basis, whether or not the overshooting is carried out.

SUMMARY OF THE INVENTION

In view of the foregoing problems, an object of the present invention is to provide a liquid crystal display device which can improve a displaying quality by grasping an actual temperature of displaying element in pixels, and improving a response speed based on the actual temperature measured. It is also the object of the present invention to provide the liquid crystal display device and a driving device thereof as well as a method of driving the liquid crystal display device, in which it is possible to drive each of scan signal lines on a line-by-line basis, and to more appropriately carry out overshooting, regardless of unevenness in temperatures within the displaying area of the liquid crystal display device.

In order to achieve the foregoing objects, a liquid crystal display device of the present invention having (i) a plurality of scan signal lines, (ii) a plurality of data signal lines to which video signals are supplied as data signals, and (iii) a displaying section including pixels arranged in a matrix manner, the pixels respectively connected, via switching sections, with the scan signal lines and the data signal lines corresponding to intersecting points thereof, the liquid crystal display device includes (A) a temperature sensor provided in at least one of the pixels in a displaying region of the displaying section; (B) a lead line provided unnoticeably in the displaying section, for transmitting a detection signal from the temperature sensor to a peripheral section of the displaying section; (C) a temperature measurement control section for measuring a temperature based on the detection signal transmitted from the temperature sensor; and (D) a data signal line driving section for outputting the data signal to the data signal lines in a manner based on the temperature measured in the temperature measurement control section.

According to the foregoing invention, the liquid crystal display device is provided with the temperature sensor in at least one of the pixels in the displaying area of the display section. From this temperature sensor, the detection signals are transmitted to the edge portions of the display panel via the lead line unnoticeably provided in the display section.

In a periphery of the display section, the temperature measurement control means is provided. The temperature measurement control means measures temperature based on the detection signal from the temperature sensor. In accordance with temperature of the pixel measured in the temperature measurement control means, the data-signal-line driving means outputs the data signal to the data signal lines.

Thus, the data signal outputted to the data-signal-wire reflects an actual pixel temperature. Therefore, taking into the account the response speed easily affected by the temperature changes, the gradation control can be carried out in accordance with the actual temperature of the liquid crystal display element rather than an estimated temperature. This realizes a suitable response speed for carrying out the displaying in the display area of the display panel.

Thus, it is possible to provide the liquid crystal display device which can improve the displaying quality by measuring the actual temperature of the liquid crystal element in the pixels, and improving the response speed based on the actual temperature measured.

In order to achieve the foregoing objects, a liquid crystal display device of the present invention includes (i) a plurality of scan signal lines, (ii) a plurality of data signal lines to which video signals are supplied as data signals, and (iii) a displaying section including pixels arranged in a matrix manner, the pixels respectively connected, via switching sections, with the scan signal lines and the data signal lines corresponding to intersecting points thereof, the liquid crystal display device includes (A) a plurality of data generating sections for generating the data signals; (B) a data generating section containing section for containing therein the plurality of data generating sections, and (C) a data generating section selecting section for selecting one of the data generating sections on a line-by-line basis for the respective scan signal lines.

In order to achieve the foregoing objects, a method of the present invention for driving a liquid crystal display device having (i) a plurality of scan signal lines, (ii) a plurality of data signal lines to which video signals are supplied as data signals appropriate for grey scale display, and (iii) a displaying section including pixels arranged in a matrix manner, the pixels respectively connected, via switching sections, with the scan signal lines and the data signal lines corresponding to intersecting points thereof, the method includes the steps of (I) preparing a plurality of data generating sections for generating the data signals, and (II) supplying the data signals to the pixels, the data signals generated in the one of the data generating sections selected on a line-by-line basis for the respective scan signal lines. Therefore, it is possible to switch over the data generating sections on the line-by-line basis for the respective scan signal lines.

According to the foregoing invention, the plurality of the data generating sections are provided, and the data signals are supplied to the pixels, from the data generating sections selected on the line-by-line basis for the respective scan signal lines. Therefore, with the present invention, it is possible to switch over the data generating sections on the line-by-line basis for the respective scan signal lines.

For example, in a case of displaying black in top and bottom areas of a display screen, a video signal of a picture whose top and bottom portions are black is generated, and then inputted as the data signal in a conventional art. However, in the present embodiment, the same display can be achieved by merely fixing the output level (black level) of one of the data generating sections.

In order to achieve the foregoing objects, in a method of the present invention for driving a liquid crystal display device including, (i) a plurality of scan signal lines, (ii) a plurality of data signal lines to which video signals are supplied as data signals appropriate for grey scale display, (iii) a displaying section including pixels arranged in a matrix manner, the pixels respectively connected, via switching sections, with the scan signal lines and the data signal lines corresponding to intersecting points thereof, is provided with (I) a plurality of data generating sections for generating data signals of the different output levels based on an inputted video signal and a video signal that is at least one frame earlier than the inputted video signal, (II) data generating section containing means for containing therein the plurality of the data generating sections, and (III) data generating section selecting means for selecting one of the data generating sections on a line-by-line basis for the respective scan signal lines.

In order to achieve the foregoing objects, in a method of the present invention for driving a liquid crystal display device having (i) a plurality of scan signal lines, (ii) a plurality of data signal lines to which video signals are supplied as data signals appropriate for grey scale display, and (iii) a displaying section including pixels arranged in a matrix manner, the pixels respectively connected, via switching sections, with the scan signal lines and the data signal lines corresponding to intersecting points thereof, the method includes the steps of (I) preparing a plurality of data generating sections for generating the data signals based on an inputted video signal and a video signal that is at least one frame earlier than the inputted video signal, and then generating, by using the plurality of the data generating sections, the data signals of the different output levels, based on difference between the video signal and the inputted video signal of the at least one frame earlier than the inputted video signal; and (II) supplying the data signals to the pixels, the data signals generated in the one of the data generating sections selected on a line-by-line basis for the respective scan signal lines.

According to the foregoing invention, the plurality of data generating sections are provided for generating the data signals based on the inputted video signal and the video signal that is at least one frame earlier than the inputted video signal. Here, each of the data generating sections generates the data signals of the different output levels, based on difference between the video signal and the inputted video signal of the at least one frame earlier than the inputted video signal. These data generating sections are provided in the data generating section containing means, and by the data generating section selecting means, one of the data generating sections is selected on the line-by-line basis for the respective scan signal lines.

Therefore, unlike overshooting carried out in a conventional liquid crystal display device, it is possible to optimize the overshooting on the line-by-line basis for the respective scan signal lines. Thus, response speed is corrected more suitably in accordance with characteristics of liquid crystal.

As a result, it is possible to provide the liquid crystal display device and the method therefor, in which the overshooting is optimized even if the temperatures get uneven within the displaying area.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 6($a$) is a graph which depicts a time taken for reaching 30 grey level, in a case where a voltage for obtaining 50 grey level is overshot at 25° C.

FIG. 6($b$) is a graph which indicates the time taken for reaching 30 grey level, in a case where a voltage for obtaining 80 grey level is overshot at 0° C.

FIG. 6($c$) is a graph showing relationship between a voltage impressed and time in a case where temperature of the case in FIG. 6($b$) the temperature is falsely recognized as 10° C.

FIG. 7($a$) to FIG. 7($d$) are front views of a display panel of the liquid crystal display device illustrating temperature distributions at various points of time.

FIG. 10(b) is a view illustrating a configuration of a memory in the liquid crystal display device shown in FIG. 10(a).

FIG. 15 is a view illustrating a configuration of a memory provided in the driving device of the liquid crystal display device shown in FIG. 13.

DESCRIPTION OF THE EMBODIMENTS

The following describes the present invention in detail with reference to various embodiments.

Embodiment 1

An embodiment of the present invention is described as follows with reference to FIGS. 1 through 9.

Figure 2:
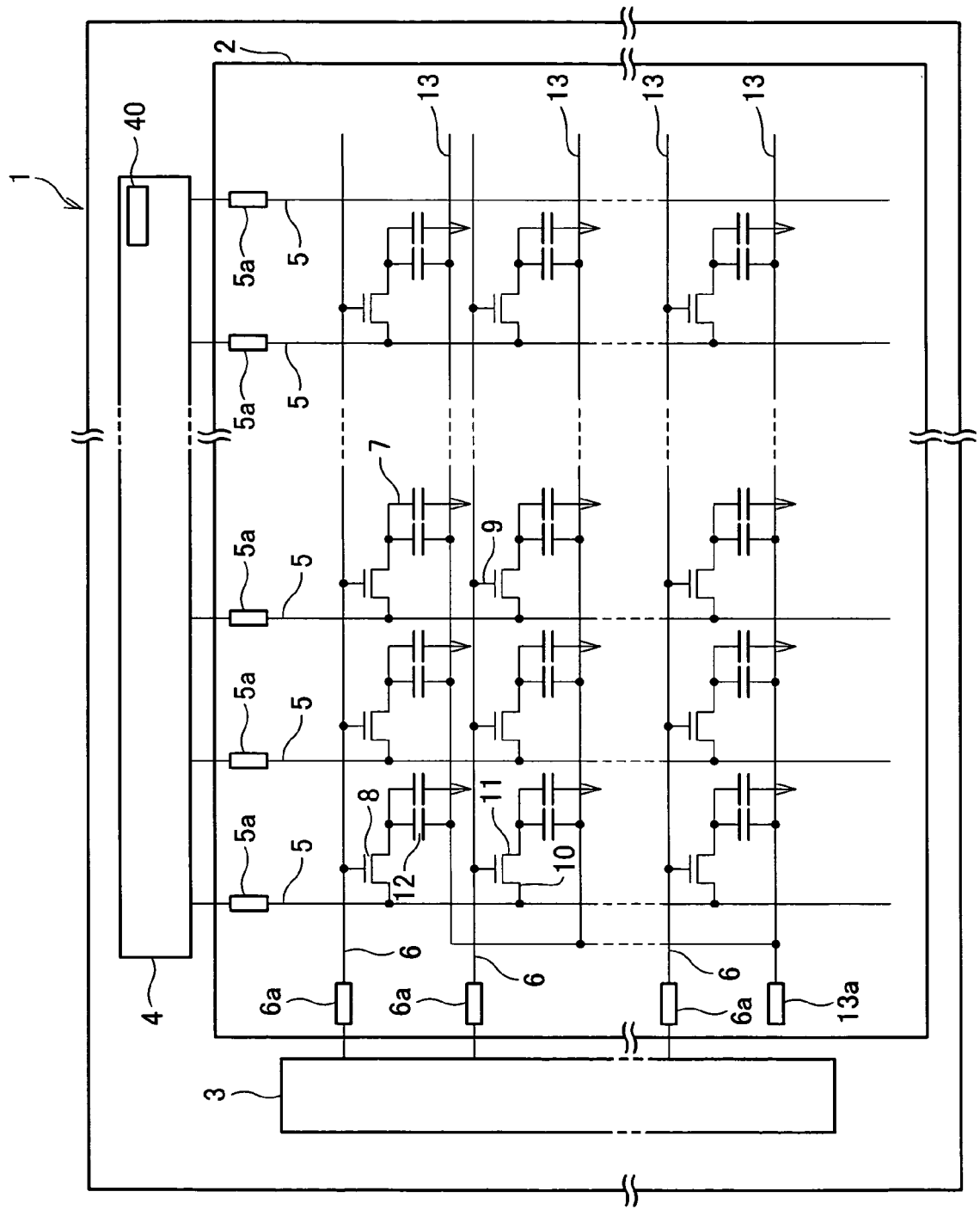
FIG. 2 is a block diagram illustrating a configuration of a display driving section of the liquid crystal display device.

As shown in FIG. 2, in the present embodiment, a liquid crystal display device 1 which is an active matrix type display device, includes a display panel 2 serving as a displaying section, a scan-signal-line driving section 3 for outputting a scan signal, and a data-signal-line driving section 4 serving as data-signal-line driving means for applying a data signal (i.e. video signal). For example, the display panel 2 is provided with (i) a pair of glass substrates (a first glass substrate and a second glass substrate) arranged in parallel to each other, (ii) polarizers respectively formed on outer surfaces of the first and second glass substrates, (iii) transparent electrodes respectively formed on inner surfaces of the first and second glass substrates, (iv) alignment films formed on the transparent electrodes, (v) liquid crystal between the first and second glass substrates, and (vi) sealing material for sealing the liquid crystal between the first and second glass substrate. For example, on the first glass substrate, one common transparent electrode is provided and connected to each of pixels, whereas, on the second glass substrate the individual transparent electrodes are provided in a matrix manner and respectively connected to their corresponding pixels.

The second glass substrate is provided with a plurality of data signal lines 5 arranged in parallel to each other, and a plurality of scan signal lines 6 arranged in parallel to each other such that the scan signal lines 6 perpendicularly intersect the data signal lines 5. The data signal lines 5 are electrically insulated from the scan signal lines 6 at the intersections. A pixel electrode 7 is provided in each of regions surrounded by the data signal lines 5 and the scan signal lines 6. This pixel electrode 7 is connected with a TFT (Thin Film Transistor) 8 serving as a switching section (switch).

The data signal lines 5 are connected with the data-signal-line driving section 4 via signal line terminals 5a. The data signal lines 5 are for data signal transmission. On the other hands, the scan signal lines 6 are connected with the scan-signal-line driving section 3 via scan signal line terminals 6a. The scan signal lines 6 are for scan signal transmission.

Figure 3:
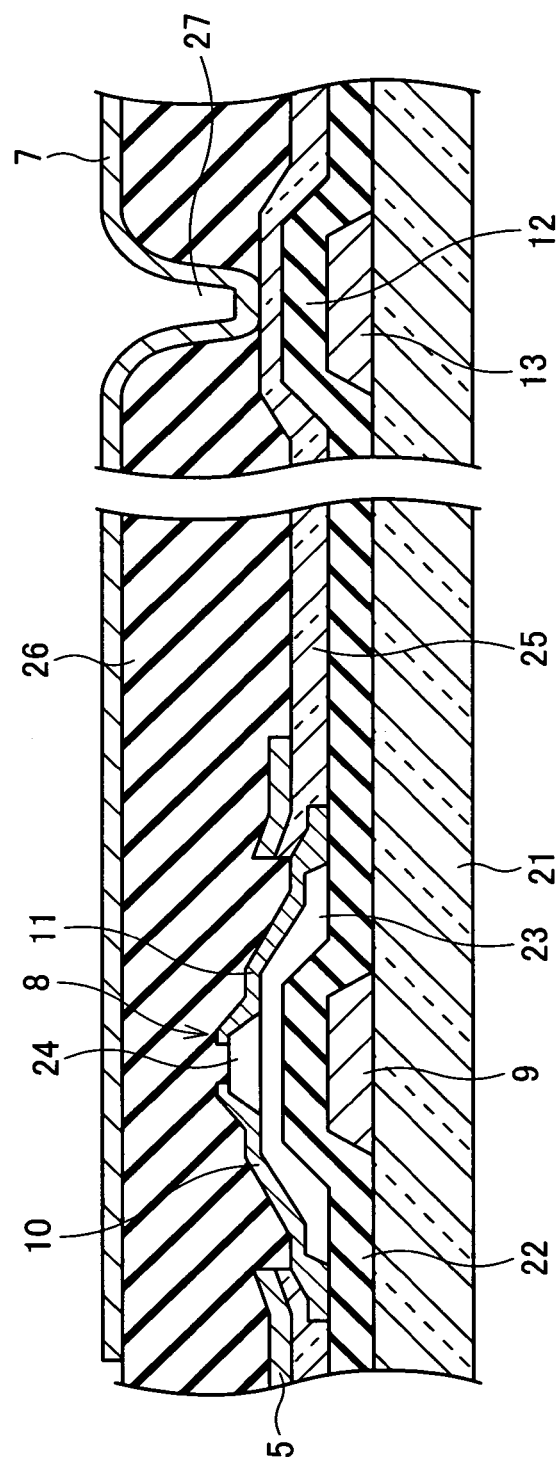
FIG. 3 is a cross sectional view taken on A-A' in FIG. 1.

As shown in FIG. 3, the TFT 8 is formed on a glass substrate 21 and includes a gate electrode 9, a gate insulating film 22, a semiconductor layer 23, a channel protection layer 24, and a n+-Si layer in this order. From the n+-Si layer, a source electrode 10 and a drain electrode 11 are formed. As shown in FIG. 2, the gate electrode 9 of the TFT 8 is connected with the scan signal line 6, and the source electrode 10 of the TFT 8 is connected with the data signal line 5. Further, as shown in FIG. 3, the drain electrode 11 of the TFT 8 is connected with a connecting electrode 25. The drain electrode 11 is connected with the pixel electrode 7 via the connecting electrode 25.

Each pixel electrode 7 is respectively provided to a region surrounded by adjacent data signal lines 5 and the adjacent scan signal lines 6. An interlayer insulating film 26 is interposed between (i) the pixel electrode 7 and (ii) a plane including the TFT 8, the scan signal lines 6, and the data signal lines 5. Each edge of the pixel electrode 7 respectively overlaps the data signal lines 5 and/or the scan signal lines 6. The pixel electrode 7 and the connecting electrode 25 are connected with each other via a contact hole 27 through the interlayer insulating film 26.

Further, on the glass substrate 21 a supplementary capacitor line 13 is provided between the adjacent scan signal lines 6 in such a manner that the supplementary capacitor line 13 is parallel to the scan signal lines 6. The supplementary capacitor line 13 is connected to each of the pixel electrodes 7, commonly. Further, the supplementary capacitor 12 is formed between the supplementary capacitor line 13 and the contact hole 27.

As shown in FIG. 2, the supplementary capacitor line 13 is short-circuited, and is connected with the second glass substrate via a supplementary capacitor line terminal 13a.

In the foregoing configuration of the active matrix type liquid crystal display device 1, the TFTs 8 are controlled (turned ON and OFF) in accordance with the scan signal supplied thereto via the respective scanning signal lines 6 on which the TFTs 8 are located. When the TFT 8 is in an on-state, the data signal is inputted to the pixel electrode 7 and to the supplementary capacitor 12 via the data signal line 5. The data signal is then written into liquid crystal capacitor formed from the pixel electrode 7, a counter electrode, and the liquid crystal interposed between the pixel electrode 7 and the counter electrode. The opposite electrode is the electrode that is located toward an opposite substrate (i.e. first glass substrate) from the pixel electrode 7. The data signal is also written to the supplementary capacitor 12. On the contrary, when the TFT 8 is in an off-state, the TFT 8 in the off-state blocks the inputting of the data signal into the pixel electrode 7 and the supplementary capacitor 12 from the data signal line 5, and the data signal written to the liquid crystal capacitor and the supplementary capacitor 12 is retained.

Figure 1:
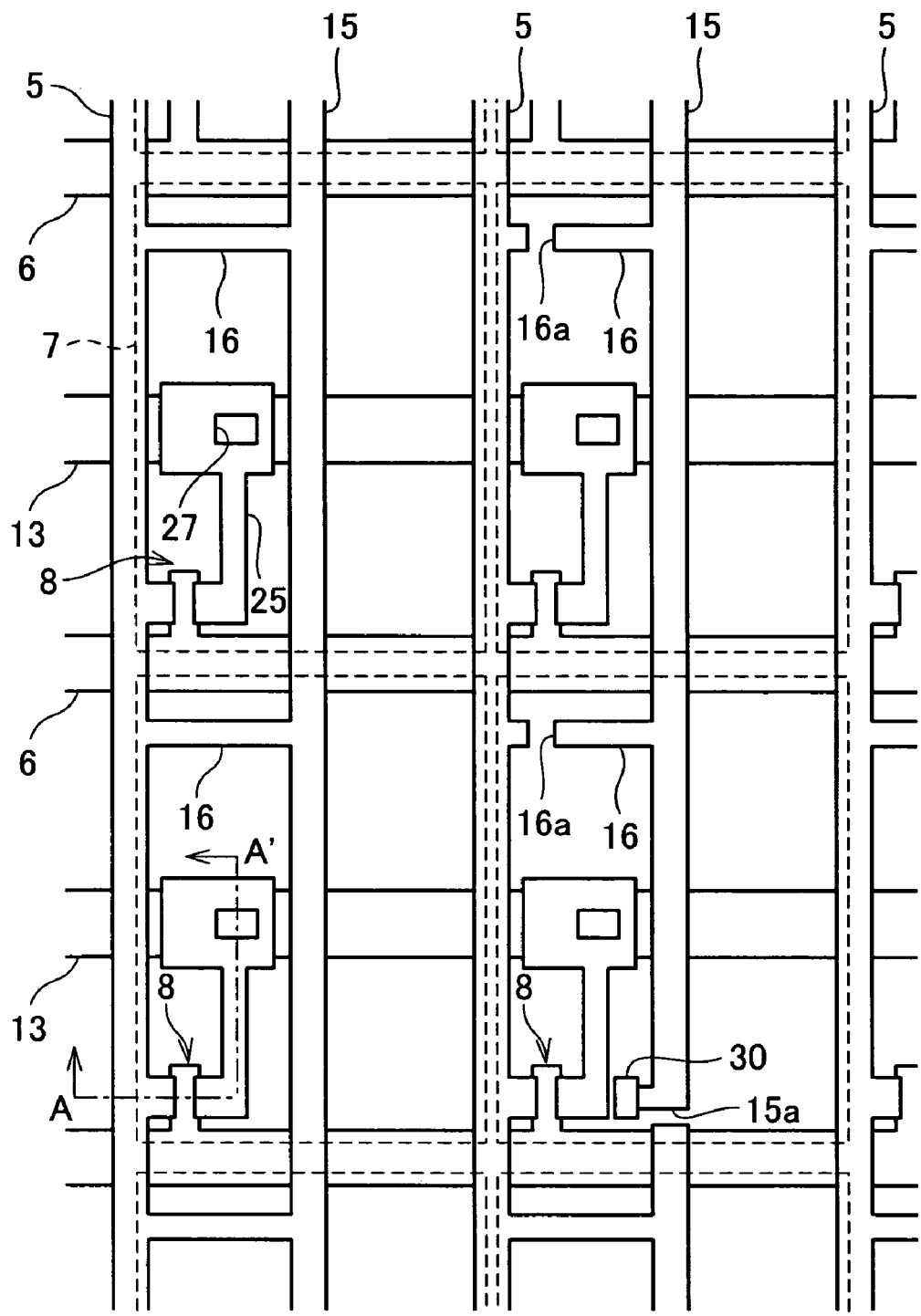
FIG. 1 illustrates an embodiment of the present invention, and is a schematic diagram illustrating a temperature sensor provided in a liquid crystal display device.

Incidentally, as shown in FIG. 1, in the liquid crystal display device 1 of the present embodiment, spare lines 15 are so provided beside the respective data signal lines 5 that the spare lines 15 are parallel to the data signal lines 5. In each of the pixels, the spare line 15 is connected with the data signal line 5 via a communicating line 16. The data signal line 5, the spare line 15, and the communicating line 16 form a so-called ladder-shape (i.e. continued H-shapes).

The spare line 15 is for avoiding deterioration in displaying quality of the display panel 2 for example, line-defect display, in case of occurrence of a defect in a data signal line 5, for example, breaking of a data signal line 5. In other words, by arranging the spare line 15 in the ladder-shaped arrangement, the data signals from the data signal line 5 are continuously supplied to the spare line 15 via the communicating line 16. Therefore, no matter where in the data signal line 5 the breaking of the date signal line 5 takes place, the data signal outputted from the data-signal-line driving section 4 is supplied to a far most end via the data signal line 5 or the spare line 15.

Further, in the liquid crystal display device 1 of the present embodiment, a temperature sensor 30 is provided in some of the pixels, by utilizing the spare line 15.

More specifically, in order to form the temperature sensor 30 within the pixel, it is necessary to provide a lead line connected at least with the temperature sensor 30. In the present embodiment, the spare line 15 plays a role of this lead line.

In order to use the spare line 15 as the lead line for the temperature sensor 30, the spare line 15 connected with the temperature sensor 30 must be electrically disconnected from the data signal line 5. Therefore, in the present embodiment, a communication-line gap 16a is formed on each of those communication lines 16 which are located toward the data-signal-line driving section 4 from the temperature sensor 30. Further, in the present embodiment, in the pixel in which the thermal sensor 30 is provided, a spare line gap 15a is formed on the spare line 15. The spare line gap 15a is located such that the temperature 30 is located toward the data-signal-line driving section 4 from the spare line gap 15a.

In this way, that part of the spare line 15 which is extended from the spare line gap 15a toward the signal line driving section 4 functions as the lead line for the temperature sensor 30. The other part of the spare line 15 which is extended oppositely with respect to the signal-data-wire driving section 4 still have original functions of the spare line 15. This is because the other part of the spare line 15 is connected with the communication lines 16 having no communication line gap 16a.

It should be noted that, in the present embodiment, the part of the spare line 15 extended from the spare line gap 15a to the data-signal-line driving section 4 acts as the lead line for the temperature sensor 30 so that a signal from the temperature sensor 30 is transmitted to the data-signal-line driving section 4. However, the present invention is not limited to this, and the other part of the spare line 15 extended oppositely with respect to the data-signal-line driving section 4 may act as the lead line for the temperature sensor 30. In this case, each of those communication lines 16a located, with respect to the temperature sensor 30, oppositely to the data-signal-line driving section 4 has the communication line gap 16a (that is, each of those communication lines 16a not located toward the data-signal-line driving section 4 from the temperature sensor 30 is provided with the communication line gap 16a). In addition to this, the spare line gap 15a is so formed on the spare line 15 that the spare line gap 15a is located toward the data-signal-line driving section 4 with respect to the temperature sensor 30.

Further, it is preferable that temperature sensor 30 be located in a vicinity of the TFT 8 or at the like location. This is because a black matrix serving as a shielding member is provided (not shown), in order to make the TFT 8 unnoticeable from outside. Therefore, by locating the temperature sensor 30 below the black matrix, it is possible to make the temperature sensor 30 unnoticeable from the outside. It is particularly preferable that the temperature sensor 30 be in a vicinity of the data signal line 5 or the scan signal line 6. This is because the black matrix is provided above the data signal line 5 and the scan signal line 6.

Incidentally, the spare line 15 is originally for supplying the data signal in a case of breaking of the data signal line 5.

Therefore in the present embodiment, the spare line 15 no longer serve as the lead line for the temperature sensor 30 in the case of the breaking of the data signal line 5. More specifically, in the case of breaking of the data signal line 5, the spare line 15 is cut off in a vicinity of the data-signal-line driving section 4 by using a laser device so that the spare line 15 is disconnected from a later-described temperature measurement control section 40. In the meantime, one of the communication line 16 is short-circuited by using the laser device. In this way, it easily becomes possible to use the spare line 15 for its original function (of ensuring the supply of the data signal). It should be noted that, it is no longer possible to use the temperature sensor 30 for temperature measurement in the pixel where the above procedure is carried out. In order to enable the temperature measurement in this case, for example, it is necessary to provide a control line (not shown) extended from the temperature measurement control section 40 through peripheral portion of the display panel 2 to a that side of the display panel 2 which is located opposite to the data-signal-line driving section 4. This arrangements allows the temperature sensor 30 to measure temperature, by performing cutting or the like of the communication line 16 located opposite to the data-signal-line driving section 4 with respect to the temperature sensor 30. Next, a configuration of the temperature sensor 30 is described in detail.

Figure 4:
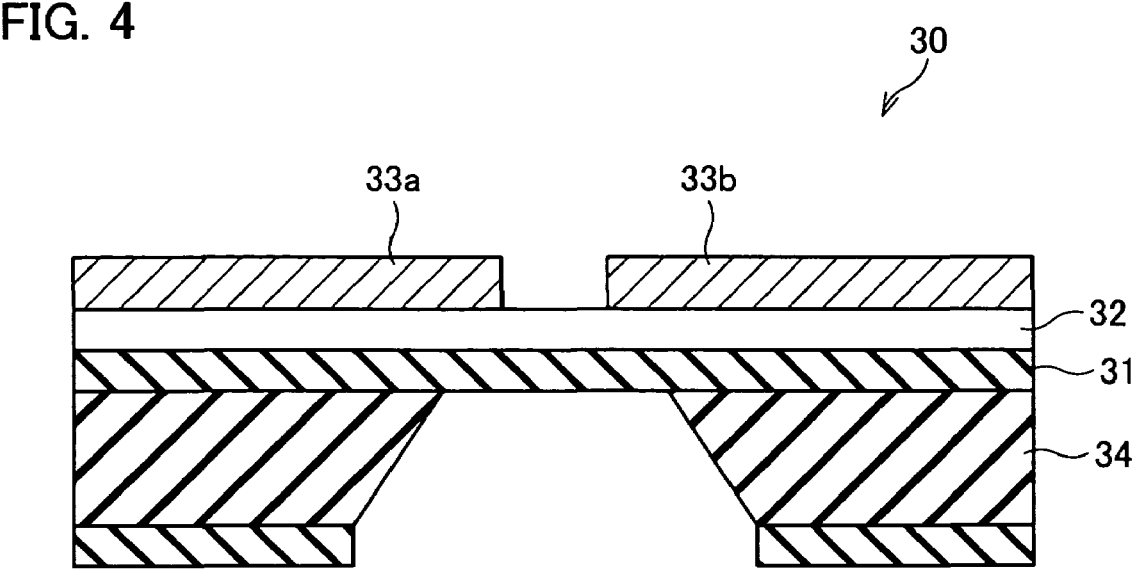
FIG. 4 is a cross sectional view illustrating a configuration of the temperature sensor in the liquid crystal display device.
Figure 5:
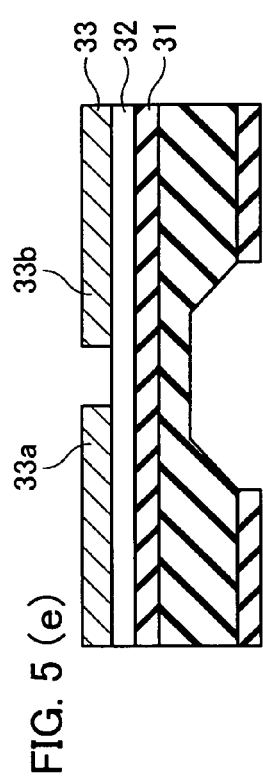
FIG. 5($a$) to FIG. 5($h$) are cross sectional views illustrating steps of manufacturing the temperature sensor.
Figure 5:
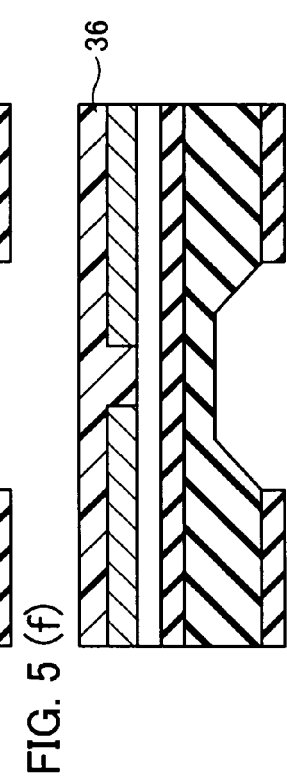
Figure 5:
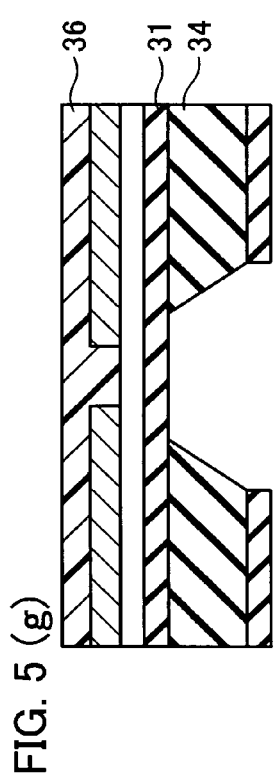
Figure 5:
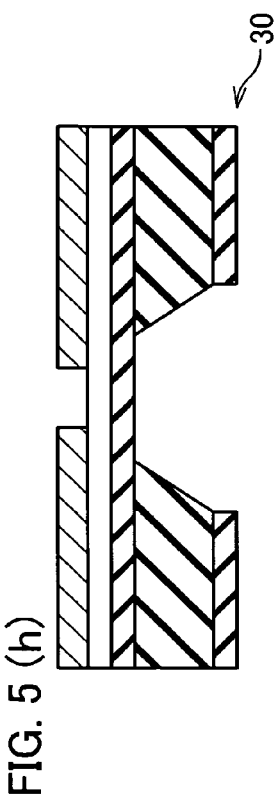
Figure 5:
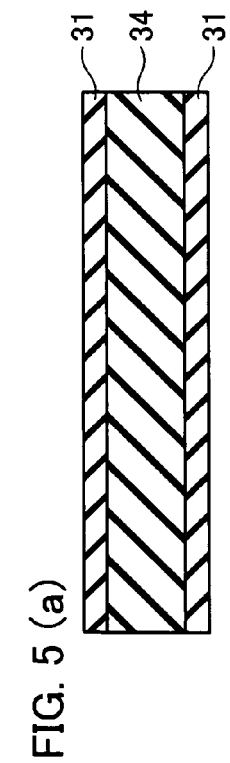
Figure 5:
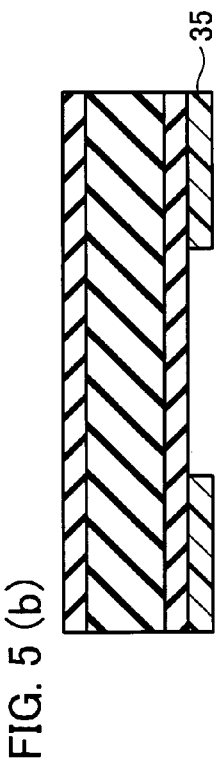
Figure 5:
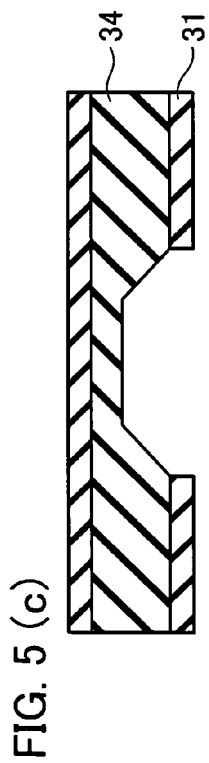
Figure 5:
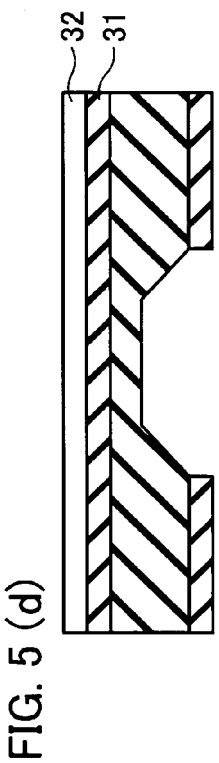

In the present embodiment, the temperature sensor 30 is directly formed in some of the liquid crystal elements. For example, as illustrated in FIG. 4, the temperature sensor 30 includes aluminum (Al) electrodes 33a and 33b, an oxide film 31, and CrNi film 32. The aluminum (Al) electrodes 33a and 33b are formed with a space therebetween and located on the oxide film 31, and the CrNi film 32. The oxide film 31 is made of silicon dioxide ($SiO_2$). This temperature sensor 30 is a thermister type sensor which utilizes a phenomenon in which carrier concentration of a semiconductor changes exponentially in accordance with temperature. As such, the temperature sensor 30 measures the temperature by measuring resistance in the space between the aluminum electrodes 33a and 33b. It should be noted that the present embodiment adopts CrNi film 32, however the present invention is not limited to this, and the present invention may adopt an oxide semiconductor made of a transition metal such as manganese (Mn), nickel (Ni), Cobalt (Co) or the like.

A method for forming the temperature sensor 30 is described with reference to FIG. 5(a) to FIG. 5(h).

First, as shown in FIG. 5(a), polished surfaces of both sides of a silicon (Si) wafer 34 are subjected to a heat treatment so as to form the oxide films 31 made of the silicon dioxide ($SiO_2$). Next, as shown in FIG. 5(b), by patterning a resist film 35 is formed on that oxide film 31 which is on a lower side of the silicon wafer 34 in the figure. Next, as shown in FIG. 5(c), etching is carried out with respect to the silicon wafer 34 and the oxide film 31 on the lower side. Then the resist film 35 is removed. Next, CrNi film 32 is formed as shown in FIG. 5(d). Then, as shown in FIG. 5(e), an aluminum film 33 is formed by carrying out a vacuum deposition, and the space is formed on the aluminum film 33, thereby forming the aluminum electrodes 33a and 33b.

Next, a protection film 36 is formed on the aluminum electrodes 33a and 33b as shown in FIG. 5(f). Then, another etching is carried out with respect to the oxide film 31 on the lower side and the silicon wafer 34, so that the oxide film 31 on an upper side of the silicon wafer 34 is exposed. Finally, as shown in FIG. 5(h), the protection film 36 is removed, and thereby the temperature sensor 30 is prepared. Note that the protection film 36 is formed in the step shown in FIG. 5(f), This protection film 36 is for preventing the aluminum electrodes 33a and 33b from being eroded during the etching carried out again in the step shown in FIG. 5(g). The method for forming the temperature sensor 30 may adopt a technology described in "R&D for Non-Contact Thermo Sensor Using Infrared Light" by Tsuyoshi MANO (Fuji Industrial Research Institute of Shizuoka Prefecture), Hirohisa MASUI (Shizuoka Industrial Research Institute of Shizuoka Prefecture), and 14 others "R&D on Safety-sensing technology for automobiles: Result Reporting Text for Researches on Creative Technologies for Regional-Development in Fiscal Years 2000-2002 for (Joint-Project of academic, business, and governmental circles for promoting development of technologies in midsize-scale companies.

In the present embodiment, the aluminum electrode 33a is connected with the spare line 15 made of ITO (Indium Tin Oxide), and the aluminum 33b is connected with the supplementary capacitor line 13.

Next described is a reason why the temperature sensor 30 is formed within the pixel of the liquid crystal display device 1 of the present embodiment.

Firstly, the liquid crystal display device 1 of the present embodiment is a very fine liquid crystal display device used for a computer. For displaying moving pictures or TV images, the very fine liquid crystal display device 1 has such a problem that its response speed is slow. Specifically, the liquid crystal, which is a capacitive load, holds an alignment status caused by application of a data signal voltage to the pixel electrode (holding characteristic). Therefore, unlike a CRT display, the liquid crystal display device can carry out the display without causing flickering. However, the response speed of the liquid crystal is slow. Particularly in relation to intermediate gradations, the response speed is not fast enough to respond within one-frame period of video input signal. This causes a problem such as occurrence of image sticking during the display of the moving pictures, thereby deteriorating the displaying quality.

In order to solve the foregoing problem, according to the overshoot method or the like a change greater than a change instructed by input data signals applied to the liquid crystal. In this way the response speed is improved. In the liquid crystal display device 1, temperature within a display panel 2 is affected by environment temperature surrounding the display panel 2. This temperature becomes uneven over the display panel 2 during display operation. Accordingly, in order to improve the response speed, it is necessary to apply to the display panel 2 such a change that is, to an extent required by the temperature within the display panel 2, greater than the change instructed by the input data. Otherwise, it is impossible to attain appropriate improvement in the responding speed. The failure in improving the responding speed leads to display quality deterioration during the display of the moving pictures.

More specifically, in the overshoot method, as illustrated in FIG. 6(a), for example, a data signal voltage for obtaining a 50 grey level is applied so as to display 30 grey level at 25° C.

As a result, it takes shorter time to reach 30 grey level compared with a case where a data signal voltage for obtaining 30 grey level is impressed.

Now, for example, it is assumed that as illustrated in FIG. 6(b), at 0° C., 30 grey level can be reached within 10 m seconds by applying the data signal voltage for obtaining 80 grey level. If the temperature of the liquid crystal element is falsely recognized as 10° C., it takes 15 m seconds to reach 30 grey level (see FIG. 6(c)). As a result, the response speed becomes insufficient for responding changes in the moving picture.

In view of that, it is necessary to more accurately correct the data signal voltage by monitoring the temperature, in order to improve the response speed. Particularly during the winter, low temperature causes slow response speed immediately after power is turned on.

Here in the actual display panel 2, changes in the temperature of the display panel 2 is observed as shown in FIG. 7(a) to FIG. 7(d). Increases in the temperature of the display panel 2 is attributed to heat transferred from a backlight (not shown) provided at a back of the display panel 2. More specifically, 30 min. after the power is turned on, the temperature distribution of the display panel 2 at surrounding temperature of 24° C. is as low as 32° C. rather evenly (see FIG. 7(a)). Then, 60 min. after the power is turned on, the temperature rises to 36.8° C. in approximate upper ⅘ of the display panel 2, while the temperature is 30.0° C. in approximate lower ⅕ of the display panel (see FIG. 7(b)). Note that the temperature in the upper portion of the display panel is higher than the lower portion of the display panel. This is because heat travels upwardly from the lower portion to higher portion. At 90 min. after the power is turned on, the temperature of the display panel 2 reaches a saturated state, and the temperature rises to 38.3° C. in approximate upper ⅘ of the display panel 2, and the temperature in approximate lower ⅕ of the display panel 2 stays 30.0° C. (see FIG. 7(c)). Further, as shown in FIG. 7(d), the temperature distribution in the display panel 2 becomes almost the same as that shown in FIG. 7(a) again in 30 min time after the power is turned off if the power is turned off when the temperature distribution of the display panel 2 is as shown in FIG. 7(c).

As described, it takes 90 min. for the temperature to reach the saturated state. It should be noted that an initial surrounding temperature of the foregoing example is 24° C. If the initial surrounding temperature is lower, it is presumed that it will take longer to reach a saturation temperature, and that the saturation temperature will be lower than 38° C.

Further, the temperature of the display panel 2 changes more greatly in approximate upper ⅘ of the display panel 2. As a result, between 30 min. and 90 min. after the power is turned on, there is a clear difference in the temperature distributions. Accordingly, in the voltage application to the data signal line 5, the temperature change in the display panel 2 should be taken into consideration. It is particularly important to monitor the temperature in a case where the temperature is low.

In the present embodiment, for example, based on the measurement result of the temperature distribution in the display panel 2, ten temperature sensors 30 are respectively provided at ten locations that are horizontally located on or above a H/3 line (see FIG. 8), where H is a height of the display panel 2. The reason why the locations of the temperature sensors 30 are thus arranged is because the temperature changes dramatically in this area.

Further, the ten temperature sensors 30 are provided at the ten locations, because (i) the data-signal-line driving section 4 of the present embodiment includes 10 source driver ICs (not shown), and (ii) it becomes possible to monitor the temperature of the display panel 2 for each of the source driver ICs. Therefore, the number of the temperature sensors 30 is not limited to 10. It should be noted that in the present embodiment, the spare line 15 extended towards the data-signal-line driving section 4 is utilized for the temperature measurement. However, the present invention is not limited to this, and it is possible to arrange such that 20 points of the measurement points are provided by providing a line around the display panel 2 so as to use the spare line 15 extending from the lower side (in FIG. 8) of the display panel 2.

Further, in the present embodiment, it is preferable that, based on the measurement result of the temperature distribution in the display panel 2, a plurality of measurement points be provided in the display panel 2 except for the top H/4 of the display panel 2 and the bottom H/4 of the display panel 2. This is because the top H/4 of the display panel 2 and the bottom H/4 of the display panel 2 are respectively edges of the display panel 2, and it is presumed that these areas do not reflect overall temperature of the display panel 2.

Further, it is preferable that the plurality of the measurement points be arranged, for example, horizontally at an equal interval, rather than randomly arranging them. In this way, it becomes possible to measure the temperature distribution in an entire horizontal direction of the display panel 2.

Figure 9:
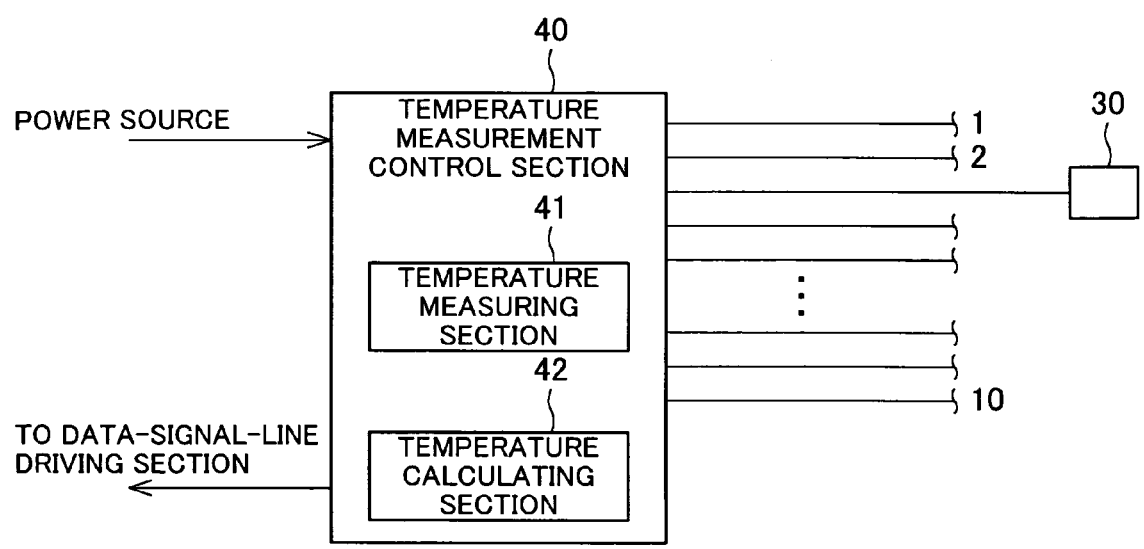
FIG. 9 is a block diagram illustrating a configuration of a temperature measurement control section in the liquid crystal display device.

As shown in FIG. 9, by arranging the temperature sensors 30 in the foregoing measurement points, detection signals from each of the temperature sensors 30 are transmitted via the spare line 15 to a temperature measurement control section (temperature measurement control means) 40. Then, the temperature is measured by a temperature measuring section 41 provided in the temperature measurement control section 40. It should be noted that, in the present embodiment, the temperature measurement control section 40 is located, for example, in an end portion of the data-signal-line driving section 4 (See FIG. 2).

More specifically, by impressing the power supply voltage to each of the temperature sensors 30, the temperature measuring section 41 calculates out the current values based on resistance values in the respective temperature sensors 30. Then, the temperatures of pixels are calculated by referring the current values to corresponding temperatures preliminary being measured.

Figure 8:
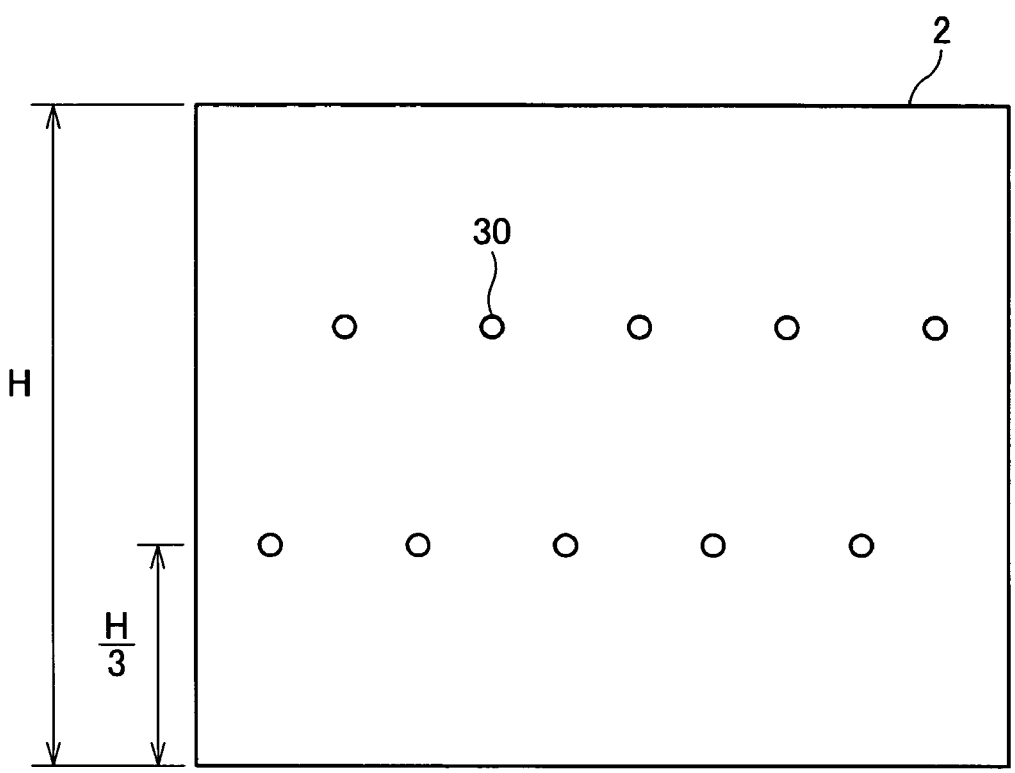
FIG. 8 is a front view illustrating a position of the temperature sensor in the display panel of the liquid crystal display device.

Wiring capacitor of the data signal line 5 connected to the temperature sensor 30 is slightly different from that of the data signal line 5 without the temperature sensor 30. The displaying quality may be slightly affected by this slight difference in the wiring capacitor between the data signal line 5 connected with the temperature sensor 30 and the data signal line 5 without the temperature sensor 30. Further, it is obvious that aperture ratio of the pixel having the temperature sensor 30 is slightly lower than that of the pixels without the temperature sensor 30. Accordingly, it is preferable that the temperature sensors 30 be positioned over the display panel 2 dispersedly as much as possible. For example, it is preferable that the temperature sensors 30 be 2-dimensionally positioned dispersedly over a displaying area at substantially equal intervals in the horizontal direction of the displaying area. Further, it is preferable that the data signal lines 5 be arranged at substantially equal intervals in that part of the display area which includes positions of the temperature sensors 30. Further, in addition to the above arrangement, it is preferable that the temperature sensors 30 be positioned at substantially equal intervals in the vertical direction of the displaying area. That is, distribution of the temperature sensors 30 as shown in FIG. 8 is preferable. It is needless to say that the distribution of the temperature sensors 30 in the display panel 2 is not limited to this, as long as the temperature sensors 30 is well dispersed with.

In the present invention, for example, 10 measured values are obtained, and an average value of these 10 measured values is calculated by a temperature data calculating section 42. The average value is sent to the data-signal-line driving section 4. Based on a temperature parameter corresponding with this average value, overshoot voltages required for displaying gradations are calculated by the data-signal-line driving section 4. The overshoot voltages thus calculated are outputted to the respective data signal lines 5.

As a result, the correction of the data signal voltage can be more accurately carried out, the correction required as a result of the changes in the temperature. In this way, the displaying quality is improved.

It should be noted that in the present embodiment, the temperature sensor 30 has a thermister configuration including CrNi film 32. This temperature sensor 30 is built in some of the pixels. However, the present invention is not limited to this and, for example, a widely available diode may be implanted in the pixel. With this diode, it is possible to detect the changes in the temperature based on output voltage varied in accordance with temperature characteristics of the diode.

Further, in the present embodiment, the spare line 15 is used as the lead line for the temperature sensor 30. However, the present invention is not limited to this, and it is possible to arrange an actual lead line, instead of using the spare line 15. Further, the spare lines 15 are arranged in the ladder-shape. However, the present invention is not limited to this, and it is possible to arrange the spare lines 15 in a shape other than the ladder-shape.

Further, in the present embodiment, the display panel 2 includes a plurality of the measurement points (10 points). However the present invention is not limited to this. For example, the display panel 2 may include only one measurement point at a center of the display panel 2.

As described, in the liquid crystal display device 1 of the present embodiment, the temperature sensor 30 is provided in at least one of the pixels in the displaying area of the display panel 2 (displaying section). From this temperature sensor 30, the detection signals are transmitted to the edge portions of the display panel 2 via the spare line (lead line) 15 provided in the display panel 2.

In a periphery of the display panel 2, the data-signal-line driving section (data-signal-line driving means) 4 including the temperature measurement control section (temperature measurement control means) 40 is provided. In the temperature measurement control section 40, the temperature measuring section 41 is provided, and this temperature measuring section 41 measures the temperatures (pixel temperature) of the pixels based on the data signal transmitted from the temperature sensors 30. In accordance with the temperature of the pixel measured in the temperature measurement control section 40, the data-signal-line driving section 4 outputs the data signal to the data signal lines 5.

Thus, the data signal outputted to the data-signal-line 5 reflects the actual pixel temperature. Therefore, the grey level control is carried out, based on the actual temperature of the liquid crystal display element rather than an estimated temperature in order to perform the grey level control taking into consideration the response speed that is easily affected by the temperature changes. This allows the display panel 2 to perform its display operation carried out at a suitable response speed.

Thus, it is possible to provide the liquid crystal display device 1 which can improve the displaying quality by measuring the actual temperature of the liquid crystal element in the pixels, and improving the response speed based on the actual temperature measured.

Further, in the liquid crystal display device 1 of the present embodiment, each of the data signal lines 5 is provided with the spare lines 15 arranged in the ladder-shape. These spare lines 15 are for preventing the data signal transmission from being suspended due to the breaking of the data signal line 5. Some of these spare lines 15 are used as the lead line for the temperature sensors 30.

Since the spare line 15 which is originally provided for the different purpose is used as the lead line for the temperature sensor 30, it is not necessary to provide another line for the specific use as the lead line. This allows the liquid crystal display device 1 to be manufactured without adding an extra process.

Further, in the liquid crystal display device 1 of the present embodiment, the temperature sensor 30 is the thermister type sensor. This temperature sensor 30 is built in the pixels by carrying out film formation in the step of forming the pixels so as to form element films from which the temperature sensor 30 is formed.

Since the temperature sensor 30 is built-in the pixel by successively forming element films in the step of forming the pixels, the temperature sensor 30 is formed during the production of as the liquid crystal display device 1. This makes manufacturing of the temperature sensor 30 easy. Further, since the temperature sensor 30 is the thermister type sensor built in the pixel in the step of forming the pixels, the temperature sensor 30 can be compactly formed as a thin film. Therefore, despite the temperature sensor 30 is in the liquid crystal element, the temperature sensor 30 does not cause deterioration in the displaying quality. Further, the temperature sensor 30 which is the thermister type sensor has low power consumption, as such, the temperature sensor 30 is suitable for the liquid crystal display device 1.

Further, the present embodiment adopts overshoot method in which the data-signal-line driving section 4 supplies, to the data signal line, the data signal voltage larger than the target data signal voltage that corresponds to a gradation value indicated by a video signal.

Because this overshoot method is largely affected by the temperature, it is necessary to measure the temperature of the pixels. Therefore, it is very advantageous to provide the temperature sensor in the pixels.

Further, in the liquid crystal display device 1 of the present embodiment, the temperature sensor 30 is provided in a vicinity of the signal line 6 or the data signal line 5.

Usually, the black matrix (shielding member) is provided in the vicinity of the scan signal line 6 or the data signal line 5. Thus, the temperature sensor 30 becomes unnoticeable when it is provided in the vicinity of the scan signal line 6 or the data signal line 5. In a case where the temperature sensor 30 is provided in the center portion of the pixel, it is necessary to provide the black matrix in the center portion. This causes the aperture ratio to decrease. In the liquid crystal display device of the present embodiment, however, the temperature sensor 30 is provided in the vicinity of the signal line 6 or the data signal line 5, therefore the aperture ratio does not decrease.

Further, in the liquid crystal display device 1 of the present embodiment, the temperature sensor 30 is shielded by the black matrix. Therefore, the temperature sensor 30 is made unnoticeable without fail.

Further, in the liquid crystal display device 1 of the present embodiment, temperature sensor 30 is provided in a plurality of pixels in the area excluding the top H/4 of the displaying region and the bottom H/4 of the displaying region. Therefore, an area where the temperature changes insignificantly is not counted in the measurement of the temperature.

Further, the temperature measurement control section 40 calculates the pixel temperature by averaging the temperatures of the pixels measured based on the detection signals from the plural temperature sensors 30. Therefore, the pixel temperature thus obtained reflect the temperature in the entire displaying area of the display panel 2 where the temperature changes significantly.

Further, in the liquid crystal display device 1 of the present embodiment, the temperature sensors 30 dispersed 2-dimensionally over displaying area are provided at substantially equal intervals in the horizontal direction of the displaying area. Therefore, it is possible to measure the pixel temperature that evenly reflects the temperatures distributed in the horizontal direction of the displaying area.

Further, in the liquid crystal display device 1 of the present embodiment, the data signal lines 5 are arranged at substantially equal intervals. Therefore, it is possible to measure the pixel temperature that equally reflects the temperatures distributed in the horizontal direction of the displaying area without fail.

Further, in the liquid crystal display device 1 of the present embodiment, the temperature sensors 30 are also arranged at substantially equal intervals in a vertical direction of the displaying area.

As such, vertical distances from one of the temperature sensors 30 to another becomes substantially the same. Thus it is possible to measure the pixel temperature that evenly reflects the temperatures distributed 2-dimensionally over the displaying area.

Embodiment 2

Figure 10:
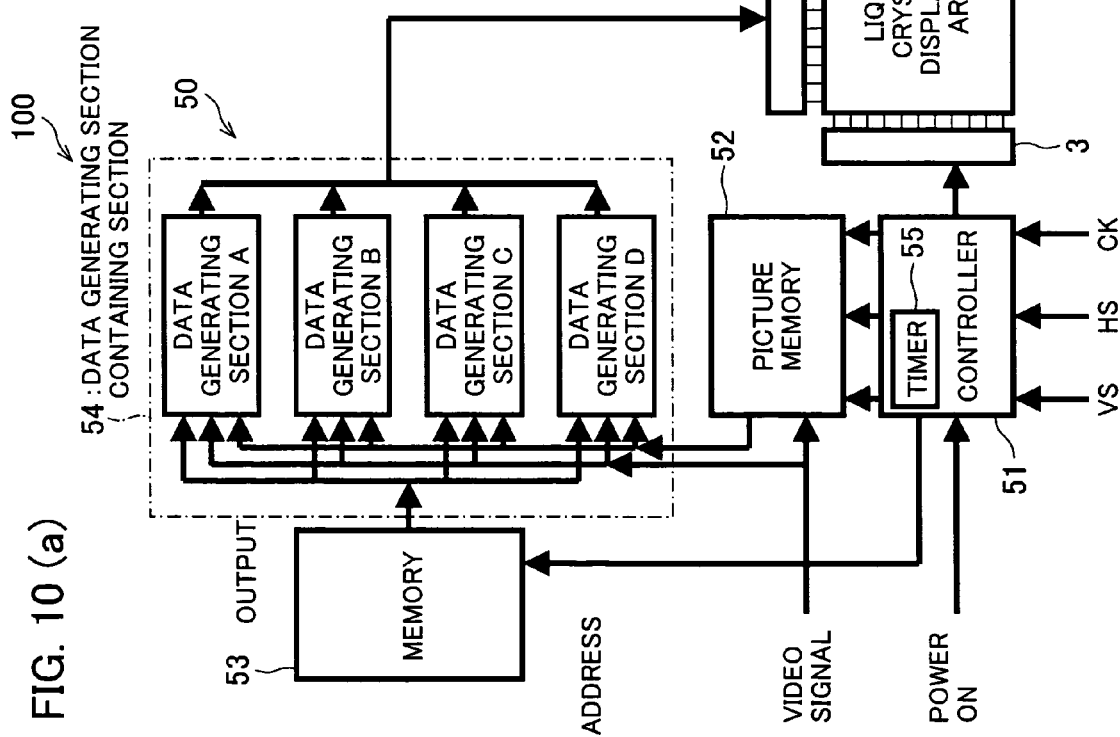
FIG. 10($a$) is a block diagram illustrating another embodiment of the present invention, and is a block diagram showing a configuration of a driving device provided in a liquid crystal display device.

Another embodiment of the present invention is described below with reference to FIGS. 3, 10(*a*) to 10(*c*) and 11. The same symbols are given to the members that have the same functions as those shown in figures of the foregoing embodiment 1, and the descriptions of those members are omitted here as a matter of convenience. It should be noted that the liquid crystal display device described in the foregoing embodiment 1 with reference to FIG. 2 is referred to as a liquid crystal display unit in the present embodiment as well as in later described embodiments 3 and 4.

Figure 11:
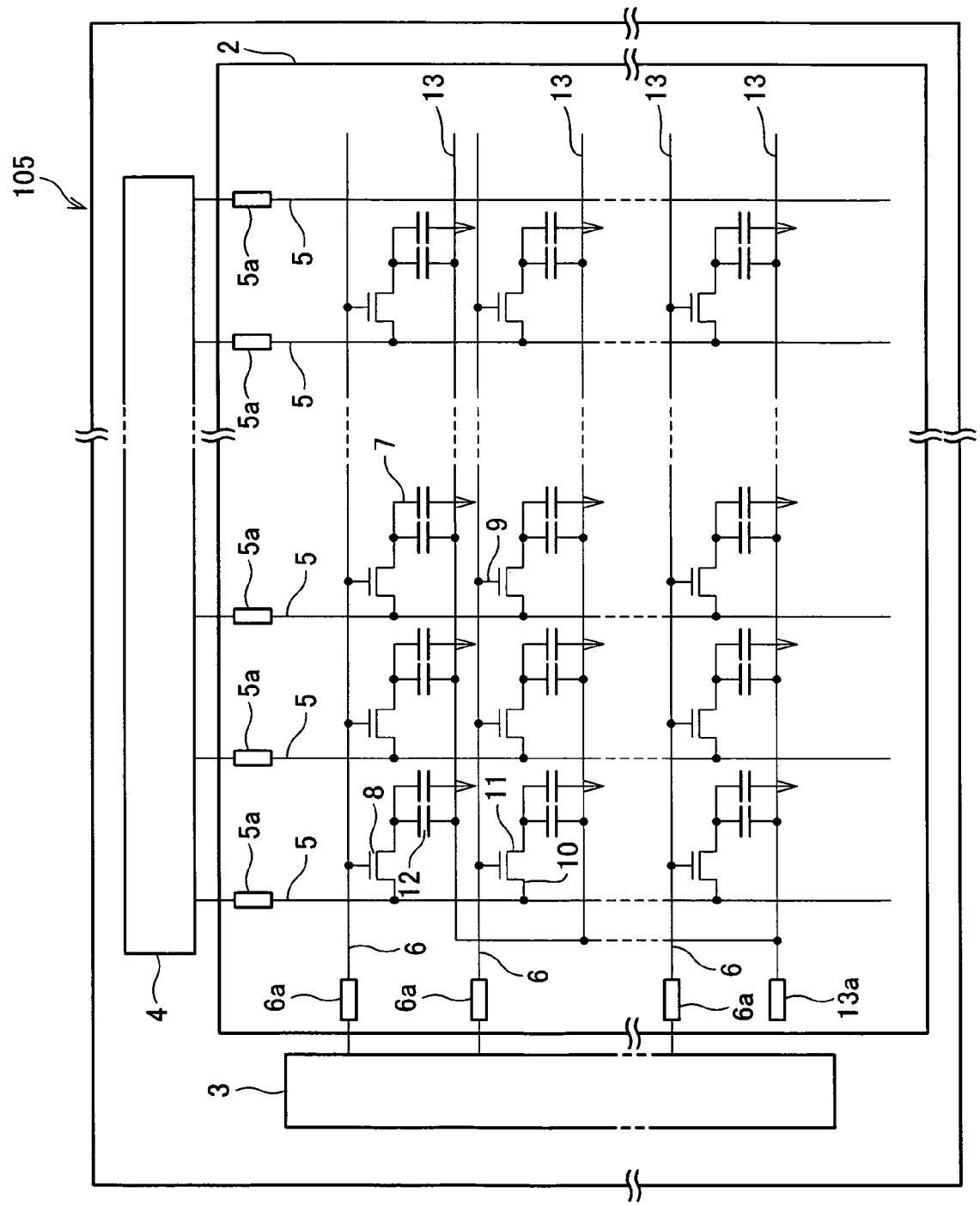
FIG. 11 is a block diagram illustrating a configuration of a liquid crystal displaying unit in the liquid crystal display device shown in FIG. 10(a).

As shown in FIG. 11, in the present embodiment, a liquid crystal display device 100 which is an active matrix type display device, includes a liquid crystal display unit 105. This liquid crystal display unit 105 includes a display panel 2 serving as a displaying section, a scan-signal-line driving section 3 for outputting a scan signal, and a data-signal-line driving section 4 serving as data-signal-line driving means for applying a data signal (i.e. video signal). For example, the display panel 2 is provided with (i) a pair of glass substrates (a first glass substrate and a second glass substrate) arranged in parallel to each other, (ii) polarizers respectively formed on outer surfaces of the first and second glass substrates, (iii) transparent electrodes respectively formed on inner surfaces of the first and second glass substrates, (iv) alignment films formed on the transparent electrodes, (v) liquid crystal between the first and second glass substrates, and (vi) sealing material, provided on peripheral portions of the first and the second glass substrates, for air-tightly sealing the liquid crystal between the first and second glass substrates.

For example, on the first glass substrate, one common transparent electrode is provided and connected to each of pixels, whereas, on the second glass substrate the individual transparent electrodes are provided in a matrix manner and respectively connected to their corresponding pixels.

The second glass substrate is provided with a plurality of data signal lines 5 arranged in parallel to each other, and a plurality of scan signal lines 6 arranged in parallel to each other such that the scan signal lines 6 perpendicularly intersect the data signal lines 5. The data signal lines 5 are electrically insulated from the scan signal lines 6 at the intersections. A pixel electrode 7 is provided in each of regions surrounded by the data signal lines 5 and the scan signal lines 6. This pixel electrode 7 is connected with a TFT (Thin Film Transistor) 8 serving as a switching section (switch).

The data signal lines 5 are connected with the data-signal-line driving section 4 via signal line terminals 5a. The data signal lines 5 are for data signal transmission. On the other hands, the scan signal lines 6 are connected with the scan-signal-line driving section 3 via scan signal line terminals 6a. The scan signal lines 6 are for scan signal transmission.

As shown in FIG. 3, the TFT 8 is formed on a glass substrate 21 and includes a gate electrode 9, a gate insulating film 22, a semiconductor layer 23, a channel protection layer 24, and a n+-Si layer in this order. From the n+-Si layer, a source electrode 10 and a drain electrode 11 are formed. As shown in FIG. 11, the gate electrode 9 of the TFT 8 is connected with the scan signal line 6, and the source electrode 10 of the TFT 8 is connected with the data signal line 5. Further, as shown in FIG. 3, the drain electrode 11 of the TFT 8 is connected with a connecting electrode 25. The drain electrode 11 is connected with the pixel electrode 7 via the connecting electrode 25.

Each pixel electrode 7 is respectively provided to a region surrounded by adjacent data signal lines 5 and the adjacent scan signal lines 6. An interlayer insulating film 26 is interposed between (i) the pixel electrode 7 and (ii) a plane including the TFT 8, the scan signal lines 6, and the data signal lines 5. Each edge of the pixel electrode 7 respectively overlaps the data signal lines 5 and/or the scan signal lines 6. The pixel electrode 7 and the connecting electrode 25 are connected with each other via a contact hole 27 through the interlayer insulating film 26.

Further, on the glass substrate 21 a supplementary capacitor line 13 is provided between the adjacent scan signal lines 6 in such a manner that the supplementary capacitor line 13 is parallel to the scan signal lines 6. The supplementary capacitor line 13 is connected to each of the pixel electrodes 7, commonly. Further, the supplementary capacitor 12 is formed between the supplementary capacitor line 13 and the contact hole 27.

As shown in FIG. 11, the supplementary capacitor line 13 is short-circuited, and is connected with the second glass substrate via a supplementary capacitor line terminal 13a.

In the foregoing configuration of the active matrix type liquid crystal display device 100, the TFTs 8 are controlled (turned ON and OFF) in accordance with the scan signal supplied thereto via the respective scanning signal lines 6 on which the TFTs 8 are located. When the TFT 8 is in an on-state, the data signal is inputted to the pixel electrode 7 and to the supplementary capacitor 12 via the data signal line 5. The data signal is then written into liquid crystal capacitor formed from the pixel electrode 7, a counter electrode, and the liquid crystal interposed between the pixel electrode 7 and the opposite electrode. The opposite electrode is the electrode that is located toward an opposite substrate (i.e. first glass substrate) from the pixel electrode 7. The data signal is also written to the supplementary capacitor 12. On the contrary, when the TFT 8 is in an off-state, the TFT 8 in the off-state blocks the inputting of the data signal into the pixel electrode 7 and the supplementary capacitor 12 from the data signal line 5, and the data signal written to the liquid crystal capacitor and the supplementary capacitor 12 is retained.

Incidentally, as shown in FIG. 10(a), the liquid crystal display device 100 of the present embodiment is provided with a driving device 50 for driving the liquid crystal display unit 105.

As shown in FIG. 10(a), the driving device 50 includes the scan-signal-line driving section 3, the data-signal-line driving section 4, a controller 51, a picture memory 52, a memory 53 (data generating section selecting means), and a data-generating-section containing section (data generating section containing means) 54. The memory 53 is used in selecting (switching over) data generating sections.

In the present embodiment, the memory 53 records therein information (temperature transition information) on variety of transition of temperatures on a surface of a displaying area in the display panel 2, that is, information on how variously the temperatures have been changed on the surface after the liquid crystal display device 100 is turned on. Further, the data-generating-section storage 54 has therein a plurality of data generating sections (e.g. 4 data generating sections A through D), for example. The data generating sections A through D are respectively configured to carry out a computation involving an inputted video signal and a video signal of one frame earlier than the inputted video signal so as to generate the data signals to be displayed. The video signal of one frame earlier than the inputted video signal (hereinafter, referred to as "one frame earlier video signal) is supplied from the video memory 52. Because there are four data generating sections A through D, for example, there are 4 computing equations accordingly in the present embodiment. Further, the data generating sections A through D are basically set so that the data signal generated therein emphasize a change in the video signal (that is, sections A through D are configured such that the data signal is so generated that a change between the data signal and the one frame earlier video signal is greater than the change between the inputted video signal and the one frame earlier video signal). The data signal is then outputted to the data-signal-line driving section 4. In short, the driving device 50 of the present embodiment basically carries out overshooting, and size (i.e. output level) of the data signal is determined by selecting which one of the data generating sections A through D.

As described, in the present embodiment, the temperature transition information of the surface of the displaying area in the display panel 2 is recorded in the memory 53 since when the liquid crystal display device 100 is turned on. In accordance with the temperature transition information, one of the data generating sections A through D for overshooting is selected on a line-by-line basis for the respective scanning signal lines 6 independently.

It is known that response speed of the liquid crystal is usually slow at a low temperature. Accordingly, conditions of the liquid crystal is most unfavorable for the responding speed, immediately after the power is turned on. In order to overshoot with a maximum overshoot value immediately after the power is turned on, it is necessary that an initial setting of the memory 53 be such that the data generating section which generates a data signal having the maximum overshoot value is selected from among the data generating sections A through D.

In this case, it is necessary that the liquid crystal display device 100 be provided with a timer, so that the selection of the data generating sections A through D is carried out based on the temperature transition information of the surface of the displaying area. The longer the liquid crystal display device 100 is turned on, the higher the surface temperature in the displaying area reaches. Accordingly, a timer 55 is activated when the liquid crystal display device 100 is turned on. When a particular period of time elapses, i.e. when the temperature of the liquid crystal reaches a particular temperature, the controller 51 outputs a signals that indicates which scan signal lines 6 are to be driven by overshooting when the particular period of time elapses. In this way, the scan signal lines 6 of preliminary assigned addresses are overshot by the data signal outputted from the data generating sections independently and respectively assigned to the respective particular scan signal lines 6 for overshooting them when the particular period of time elapses. After the temperature of the liquid crystal reaches a certain temperature, that one of the data generating sections A through D which outputs data signal having a smaller overshoot value is selected, or the display operation without overshooting is carried out by using another data generating section (not shown) that does not carry out the overshooting, or by bypassing the data generating sections that are unnecessary if no overshooting is to be carried out.

More specifically, an output from the memory 53 is used for selecting the data generating section for overshooting. In order to change the data generating sections on the line-by-line basis for the respective signal lines 6, the scan signal lines 6 are respectively numbered so that the numbers of the scan signal lines 6 respectively correspond with address numbers of addresses of the respective scan signal lines 6 in the memory 53. Increases in the temperature of the liquid crystal from turning on the power is estimated by using the timer 55, and the data generating sections are switched over referring to the respective addresses in the memory 53 in accordance with increases in the temperature of the liquid crystal.

For example, as shown in FIG. 10(b), the memory 53 includes address numbers from 00001 to n, and the scan signal lines 6 are respectively numbered from 1 to N respectively corresponding to the address numbers. Further, to each of the addresses, a series of numbers is added, which indicates which option of the data generating sections is selected for the address. This series of number is switched over along with elapse of time.

Here, it is supposed that the data generating section D overshoots the maximum overshoot value among the data generating sections A through D. To the respective addresses of the scan signal lines 6, one of series of numbers 100, 011, 010, and 001 is added independently. these series of numbers correspond respectively with the data generating sections A through D. For example, 100 corresponds with D, 011 corresponds with C, 010 corresponds with B, and 001 corresponds A. For example, these series of numbers in the addresses are switched over for the scan signal lines 6 of the number up to K every 20 min in an order of from "100", "011", "010" to "001". In accordance with these series of numbers added to the respective addresses, the data generating sections are switched over on the line-by-line basis for the respective scan signal lines 6 independently. For example, in FIG. 10(b), in a case of the address numbered k, the series of number "011" is added, thereby indicating that the data generating section C is selected for the scan signal line 6 numbered K. Then, after every 20 min. the series of number changes from 011 to 010, and from 010 to 001. In the present embodiment, the series of number further changes from 001 to 000. When 000 is added, none of the data generating sections A through D is in use, and the video signal that is not overshot is outputted to the data signal line driving section 4, without using any of the data generating sections A through D.

It should be noted that the scan signal line 6 numbered N is located in a lowest area of the display panel 2. As described later in the embodiment 4, the temperature rises more slowly in the lowest area and its vicinity. Therefore, a timing of switching-over the data generating section on a line-by-line basis for the respective scan signal lines 6 located in the lowest area and its vicinity is slower, for example, every 30 min. Thus, as described, the options of the data generating sections A through D are different on the line-by-line basis for the respective scan signal lines 6.

It is not necessary to assign one address for each of the scan signal lines 6. It may be arranged that one address is assigned to a plurality of the scan signal lines 6 in a group so that the switching over of the options of the data generating sections A to D is carried out per group of the scan signal lines 6.

As described, by the foregoing method, the liquid crystal display device 100 is not affected by uneven temperature of the displaying area. Further, it is possible to arranged such that the switching-over of the data generating sections is started when the liquid crystal reaches the particular temperature as predicted in advance, i.e. when the particular period of time elapses since the power is turned on. In this case, it may be arranged that the temperature transition in the liquid crystal display device 100 is actually measured during an inspection stage of the liquid crystal display device 100 so as to prepare, from actual measurements thus obtained, the information that is to be preliminary stored in the memory 53. Then, in the foregoing operation mechanism this arrangement attains, to some extent, the desired effect.

As described, in a liquid crystal display device 100 and its driving device 50 of the present embodiment as well as in a method of the present embodiment for driving the liquid crystal display device 100, a plurality of data generating sections A through D are provided, so that the plurality of the data generating sections A through D selected and switched over on a line-by-line basis for the respective scan signal lines 6 independently. Accordingly, the data signals, which are generated by the data generating sections A to D thus selected for the respective scan signal lines 6 independently, are supplied to the pixels via the respective scan signal lines 6. Thus, in the present embodiment, it is possible to select and switch over the data generating sections A through D on the line-by-line basis for the respective scan signal lines 6 independently.

For example, in a case of displaying black in top and bottom areas of a display screen, a video signal of a picture whose top and bottom portions are black is generated, and then inputted as the data signal in a conventional art. However, in the present embodiment, the same display can be achieved by merely fixing the output level (black level) of one of the data generating sections.

In a liquid crystal display device 100 and its driving device 50 of the present embodiment as well as in a method of the present embodiment for driving the liquid crystal display device 100, a plurality of data generating sections are provided for generating data signals based on an inputted video signal and a video signal that is at least one frame earlier than the inputted video signal. the data generating sections A through D are configured to generate the data signals of the different output levels, based on difference between the video signal and the inputted video signal of at least one frame earlier than the inputted video signal. These data generating sections are provided in the data generating section containing section data generating section containing means) 54. By the memory 53 for use in switching over data generating sections (data generating section selecting means), one of the data generating sections A through D in the data-generatingsection containing section 54 is selected on the line-by-line basis for the respective scan signal lines 6 independently.

Therefore, unlike overshooting carried out in a conventional liquid crystal display device, it is possible to optimize the overshooting on the line-by-line basis for the respective scan signal lines 6. Thus, response speed is corrected more suitably in accordance with characteristics of liquid crystal.

As a result, it is possible to provide the liquid crystal display device 100 and the method therefor, in which the overshooting is optimized even if the temperatures get uneven within the displaying area.

In the liquid crystal display device 100 and the driving device 50 thereof according to the present embodiment, the data signals supplied to the scan signal lines 6 are generated in the data generating sections A through D selected and switched over on the line-by-line basis for the respective scan signal lines 6 independently.

Further, in the liquid crystal display device 100 of the present embodiment, it is possible to supply the data signal to the scan signal lines 6 without processing the video signals in any of the data generating sections A through D. Therefore, it is possible to output the data signals without carrying out the overshooting.

Further, in the liquid crystal display device 100 of the present embodiment, the data generating section is switched over on the line-by-line basis for the respective scan signal lines 6 independently. Thus, for example, it is possible to select the data generating sections on a basis of a position in a vertical direction of the displaying panel (displaying section) 2.

Further, in the liquid crystal display device 100 of the present embodiment, it is possible to switch over the data generating sections while the display panel 2 is in use. Accordingly, for example, the data generating section can be switched over in accordance with the increases in the temperature of the displaying area. Thus, it is possible to compensate operation of the liquid crystal suitably for response characteristics of the liquid crystal which are affected by temperature changes.

Further, in the liquid crystal display device 100 of the present embodiment, the data generating sections are switched over so that a difference between a target value and an overshoot value gradually becomes smaller as time elapsed after the liquid crystal display device is turned on. Thus, it is possible to compensate operation of the liquid crystal suitably for response characteristics of the liquid crystal which are easily affected especially by temperature changes when the liquid crystal is at a low temperature.

Incidentally, the temperature of the displaying panel 2 starts to increase when the power is turned on. Therefore, it is preferable that the data generating section be switched over so that a difference between a target value and an overshoot value gradually becomes smaller along with the increases in the temperature, i.e. along with elapse of time.

In view of this, according to the present embodiment, the data generating sections A through D are configured to be switched over the so that the difference between the target value and the overshoot value gradually becomes smaller along with the elapse of the time after the liquid crystal display device 100 is turned on.

As a result, it is possible to simplify the configuration of the liquid crystal display device 100, because temperature measurement for the liquid crystal is not especially necessary in the present embodiment.

Further, in the present embodiment, the liquid crystal display device 100 includes the memory 53 for use in switching the data generating section. In this memory 53 for use in switching the data generating section, an address is assigned for each of the scan signal lines 6. The address includes address numbers indicating which scan signal line 6 the address is assigned for, and a series of number indicating the data generating section selected in accordance with how much time has elapsed since the power of the liquid crystal display device is turned on.

Thus, such memory can be suitably configured as the data generating section selecting means for use in switching over the data generating sections.

Embodiment 3

Figure 12:
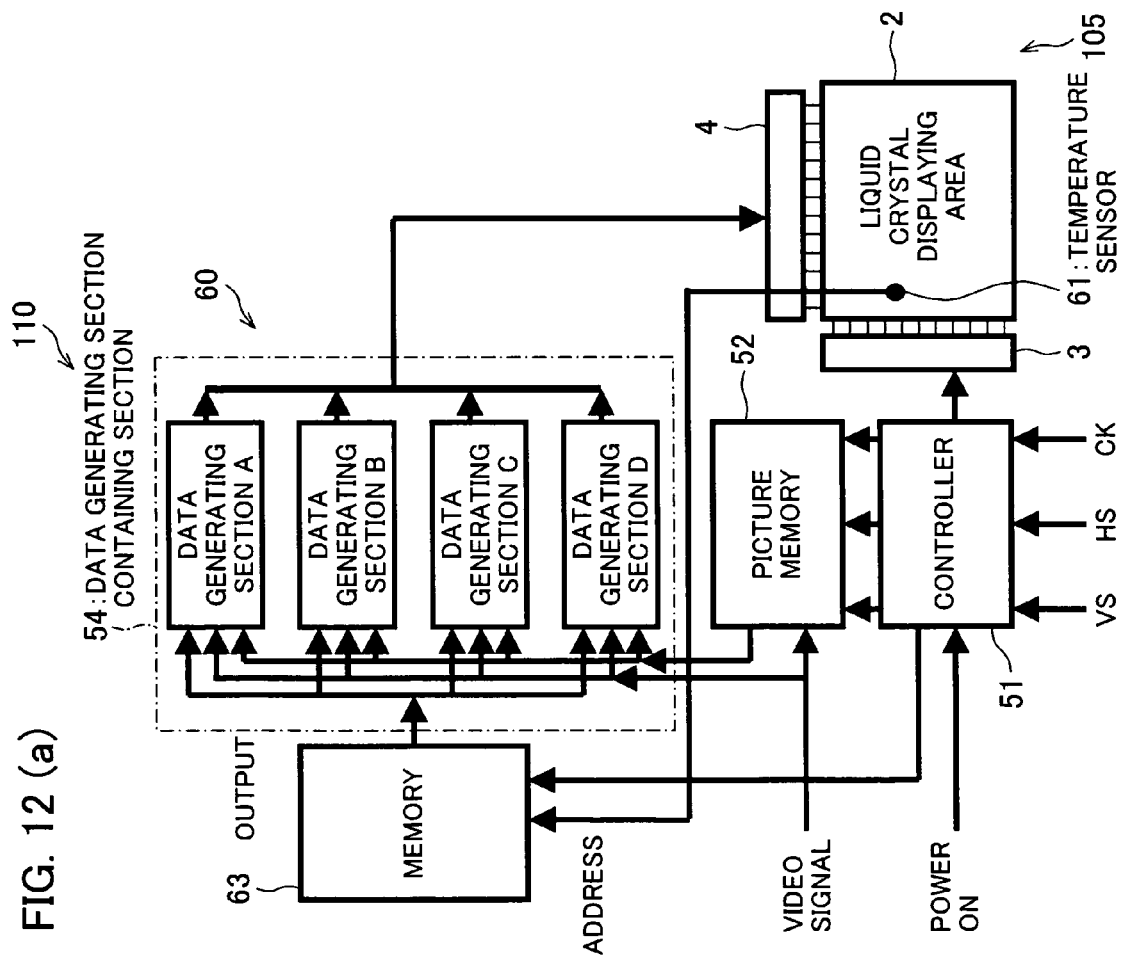
FIG. 12(a) illustrating still another embodiment of the present invention, and is a block diagram illustrating a configuration of a driving device provided in a liquid crystal display device.
FIG. 12(b) is a view illustrating a configuration of a driving device provided in the liquid crystal display device shown in FIG. 12(a).

The following describes another embodiment of the present invention with reference to FIG. 12(a) and FIG. 12(b). It should be noted that features of the present embodiment are the same as those described in the foregoing embodiment 2 unless otherwise described hereinbelow. Further, the same symbols are given to the members that have the same functions as those shown in figures of the foregoing embodiments 1 and 2, and the descriptions of those members are omitted here as a matter of convenience.

In addition to the configuration as described in the foregoing embodiment 1, a liquid crystal display device 110 of the present embodiment is provided with a driving device 60 having a temperature sensor 61 in a displaying area of a display panel 2 (See FIG. 12(a)). The temperature sensor 61 is used for obtaining temperature transition information. The temperature transition information is recorded in a memory 63 (data generating section selecting means) for use in switching data generating section. The temperature sensor 61 is also used for obtaining information of surrounding temperature in surrounding of the liquid crystal display device 110. In accordance with temperature information obtained by the temperature sensor 61, the data generating sections A through D are switched over.

More specifically in the present embodiment, the memory 63 records therein information (temperature transition information) on variety of transition of temperatures on a surface of a displaying area in the display panel 2, that is, information on how variously the temperatures have been changed on the surface after the liquid crystal display device 110 is turned on. In accordance with the transition information, the data generating sections A through D are selectively used for carrying out overshooting. Further, in the present embodiment, the memory 63 includes a Look Up Table (LUT). The Look Up Table shows which option of the data generating sections is to be selected for a particular range of the surrounding temperature for each of the scan signal lines 6.

For example, as shown in FIG. 12(b), in a case where the temperature sensor 61 indicates that the surrounding temperature is less than 32° C., the Look Up Table shows that the option is 4, therefore the data generating section D which can overshoot a maximum overshoot value is selected. In a case where the temperature sensor 61 indicates that the surrounding temperature is less than 34° C. and not less than 32° C., the option is 3, therefore the data generating section C is selected. As described, every time the surrounding temperature reaches particular ranges of the surrounding temperature, the data generating section is switched over accordingly to the option indicated in the Look Up Table.

It should be noted that the data generating sections A through D for overshooting the scan signal line 6 numbered N (i.e lower portion of the displaying panel 2) are switched over in accordance with changes in the temperature of upper portion of the display panel 2. Therefore, in the present embodiment too, the data generating sections A through D are selected on a line basis for the respective scan signal lines 6.

The temperature sensor 61 can be provided in any positions where the temperature of the liquid crystal can be measured. Therefore, the temperature sensor 61 may be a thermoelectric couple or the like, as long as the temperature sensor 61 can sense the gradual temperature changes caused after the liquid crystal display device is turned on. The information from the temperature sensor 61 is inputted to the memory 63 in such a manner that the temperatures thus measured by the temperature 61 correspond with the addresses stored in the memory 63. Then, the option of the data generating section most suitable for the address is selected. Other than what described above, the present embodiment is the same as the foregoing embodiment 1, as such, the present embodiment results in the similar effect as those obtained from the embodiment 1.

As described, in a liquid crystal display device 110 and driving device 60 thereof according to the present embodiment as well as a method of the present embodiment for driving the liquid crystal display device 110, the data generating sections A through D are selectively used in accordance with temperatures of a display panel 2. Because the response speed is compensated for in accordance with actually measured temperatures of the liquid crystal, it is possible to accurately compensate the response speed for.

Further, in the present embodiment, the data generating sections A through D are selectively used in accordance with temperature information obtained by a temperature sensor 61. Therefore, it is possible to directly compensate the response speed for in accordance with the temperature information from the temperature sensor 61. This realizes further accurate compensation of the response speed.

Further, in the liquid crystal display device 110 of the present embodiment, the memory 63 for switching data generating section includes the Look Up Table showing which option is to be selected for a particular range of surrounding temperature for each of scan signal lines 6. This is advantageous in costs, because by modifying the Look Up Table, it is possible to manufacture various models without changing designs of the models themselves.

Embodiment 4

Figure 13:
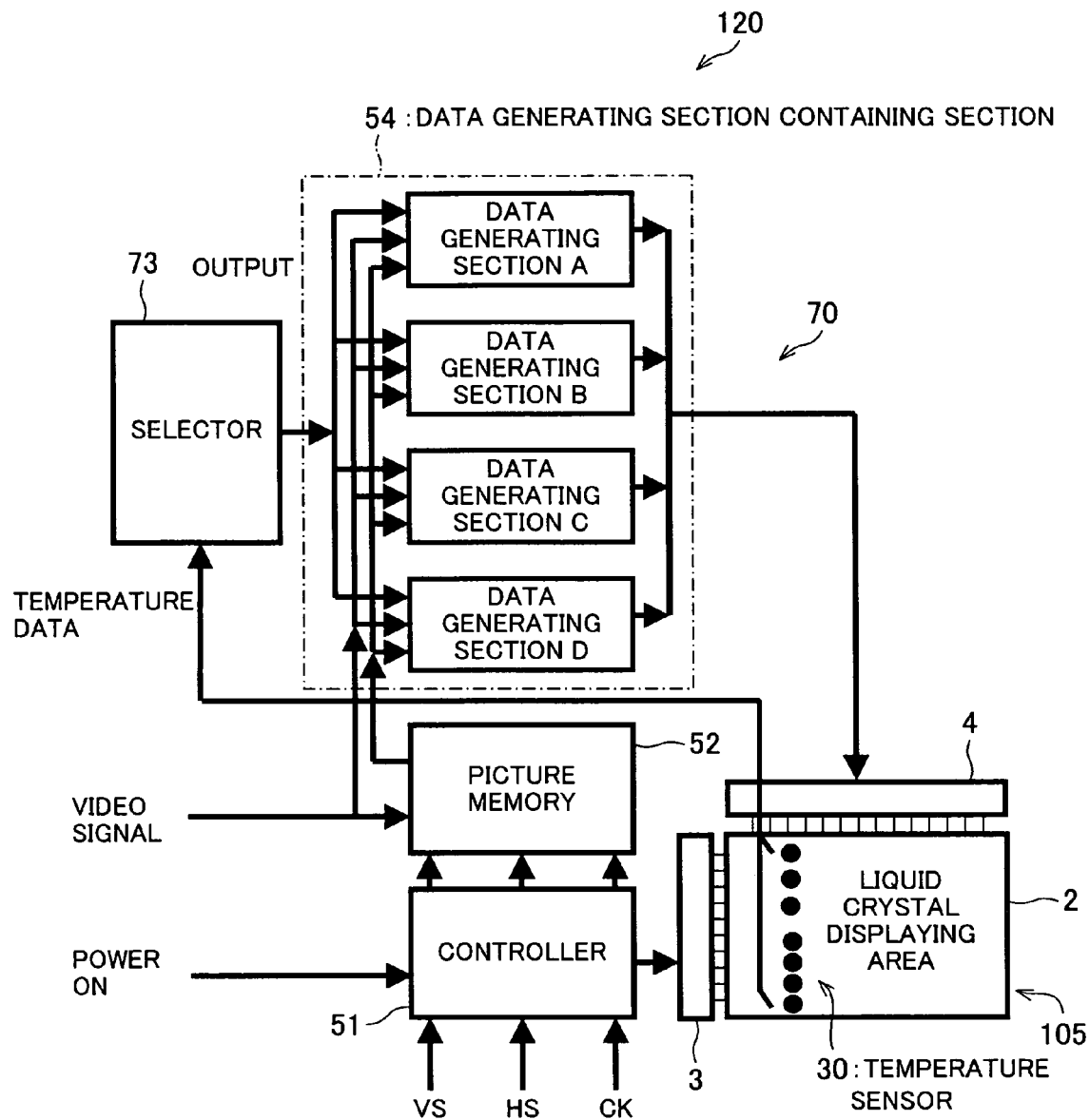
FIG. 13 illustrates yet another embodiment of the present invention, and is a block diagram showing a configuration of a driving device provided in a liquid crystal display device.
Figure 14:
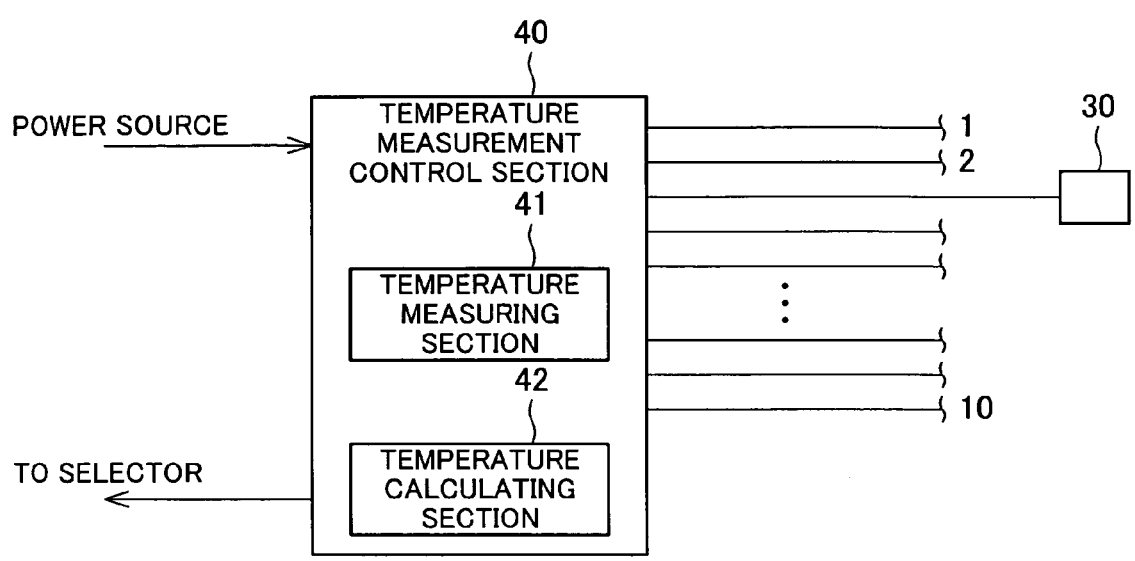
FIG. 14 is a block diagram showing a configuration of a temperature measurement control section in the liquid crystal display device shown in FIG. 13.
Figure 16:
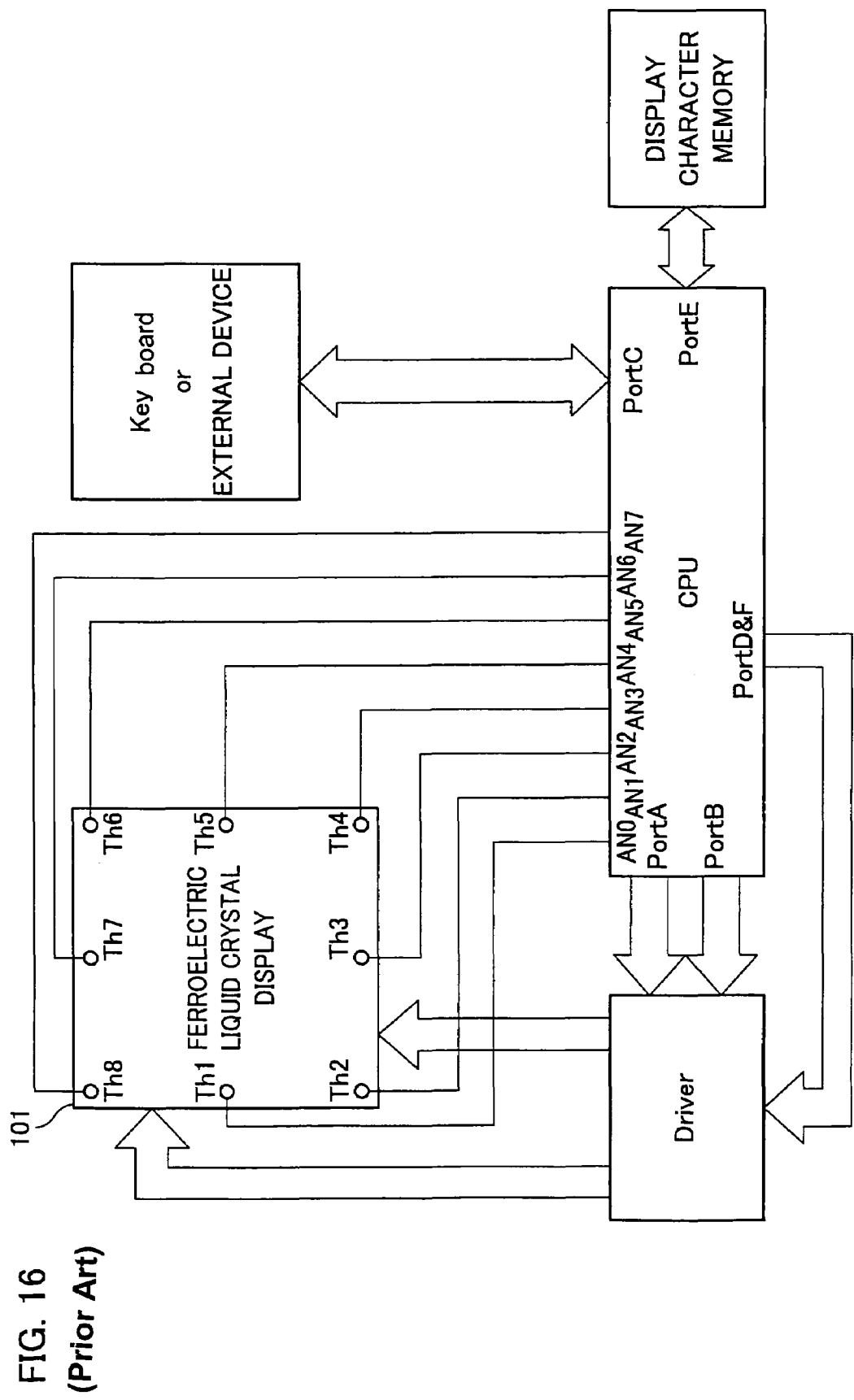
FIG. 16 is a schematic diagram illustrating a position of a temperature sensor in a conventional liquid crystal display device.
Figure 17:
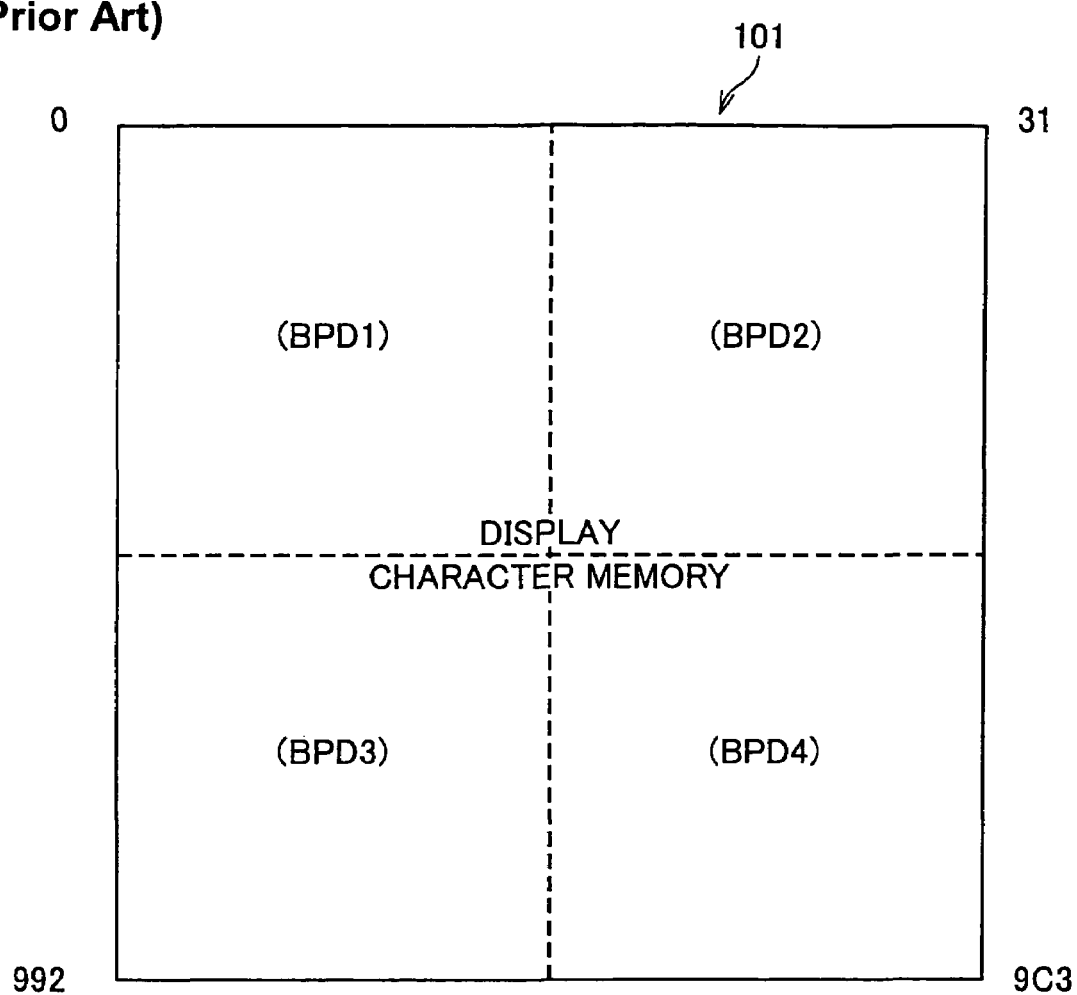
FIG. 17 is a front view illustrating the conventional liquid crystal display device in which a display panel thereof is divided into four display regions
Figure 18:
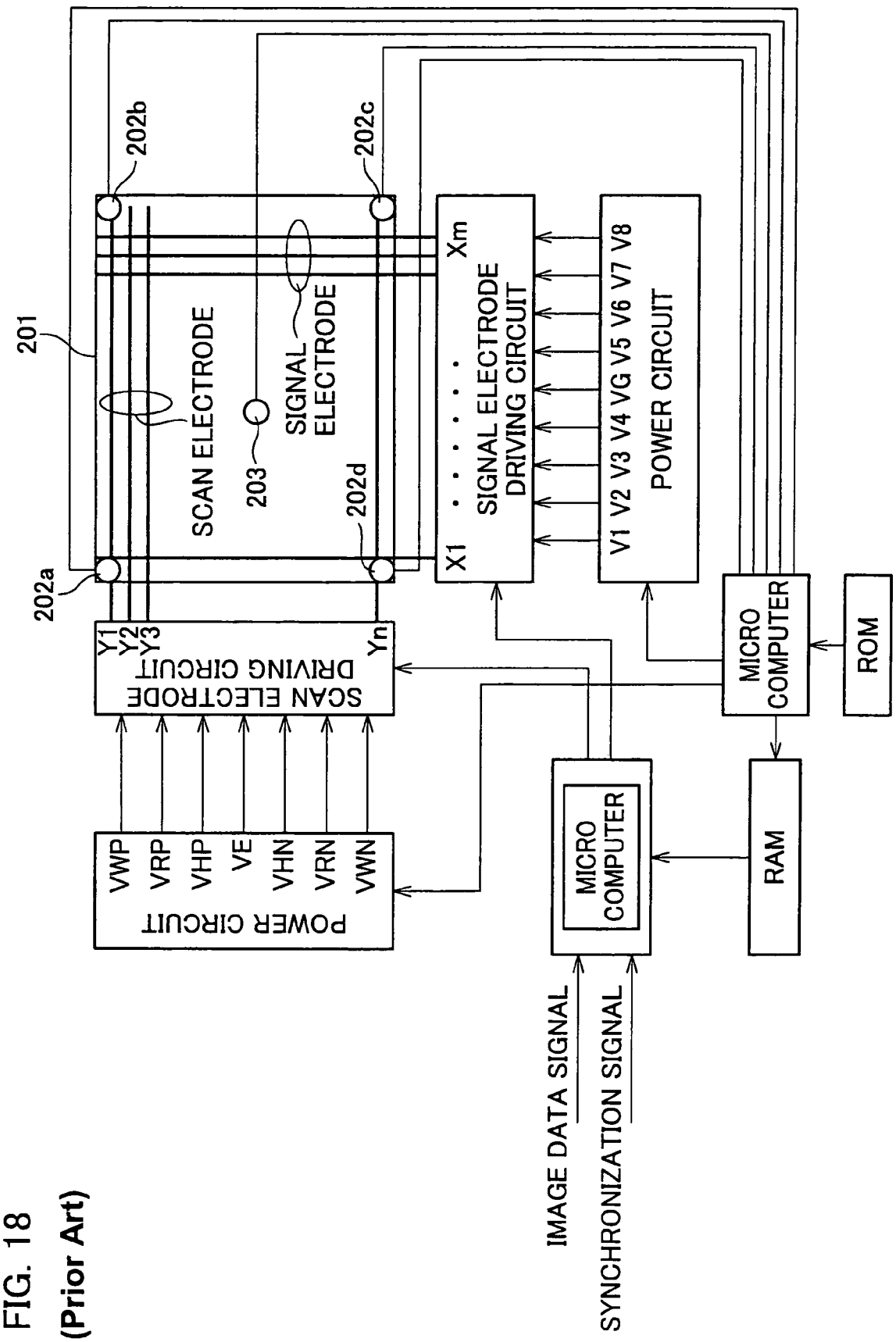
FIG. 18 is a schematic diagram illustrating a position of temperature sensor in another conventional liquid crystal display device.

The following describes another embodiment of the present invention with reference to FIG. 1, FIG. 4, FIG. 6(*a*) to FIG. 6(*c*), FIG. 7(*a*) to FIG. 7(*c*), and FIG. 13 to FIG. 15. It should be noted that features of the present embodiment are the same as those described in the foregoing embodiments 2 and 3 unless otherwise described hereinbelow. Further, the same symbols are given to the members that have the same functions as those shown in figures of the foregoing embodiments 1 to 3, and the descriptions of those members are omitted here as a matter of convenience.

The present embodiment is for carrying out more accurate temperature measurement than the invention described in the embodiment 3.

More specifically, as shown in FIG. 13, in the present embodiment, a driving device 70 of a liquid crystal display device 120 includes a temperature sensor 30 mounted in a pixel of a display panel 2, thereby enabling more accurate temperature measurement with respect to liquid crystal. In accordance with temperature measured in the above arrangement, selection of data generating section A to D for overshooting is appropriately carried out.

The following describes how to mount the temperature sensor 30 in the pixel.

As shown in FIG. 1, in the liquid crystal display device 1 of the present embodiment, spare lines 15 are so provided beside the respective data signal lines 5 that the spare lines 15 are parallel to the data signal lines 5. In each of the pixels, the spare line 15 is connected with the data signal line 5 via a communicating line 16. The data signal line 5, the spare line 15, and the communicating line 16 form a so-called ladder-shape (i.e. continued H-shapes).

The spare line 15 is for avoiding deterioration in displaying quality of the display panel 2 for example, line-defect display, in case of occurrence of a defect in a data signal line 5, for example, breaking of a data signal line 5. In other words, by arranging the spare line 15 in the ladder-shaped arrangement, the data signals from the data signal line 5 are continuously supplied to the spare line 15 via the communication line 16. Therefore, no matter where in the data signal line 5 the breaking of the date signal line 5 takes place, the data signal outputted from the data-signal-line driving section 4 is supplied to a far most end via the data signal line 5 or the spare line 15.

Further, in the liquid crystal display device 120 of the present embodiment, a temperature sensor 30 is provided in some of the pixels, by utilizing the spare line 15.

More specifically, in order to form the temperature sensor 30 within the pixel, it is necessary to provide a lead line connected at least with the temperature sensor 30. In the present embodiment, the spare line 15 plays a role of this lead line.

In order to use the spare line 15 as the lead line for the temperature sensor 30, the spare line 15 connected with the temperature sensor 30 must be electrically disconnected from the data signal line 5. Therefore, in the present embodiment, a communication-line gap 16*a* is formed on each of those communication lines 16 which are located toward the data-signal-line driving section 4 from the temperature sensor 30. Further, in the present embodiment, in the pixel in which the thermal sensor 30 is provided, a spare line gap 15*a* is formed on the spare line 15. The spare line gap 15*a* is located such that the temperature 30 is located toward the data-signal-line driving section 4 from the spare line gap 15*a*. In this way, that part of the spare line 15 which is extended from the spare line gap 15*a* toward the signal line driving section 4 functions as the lead line for the temperature sensor 30. The other part of the spare line 15 which is extended oppositely with respect to the signal-data-wire driving section 4 still have original functions of the spare line 15. This is because the other part of the spare line 15 is connected with the communication lines 16 having no communication line gap 16*a*.

It should be noted that, in the present embodiment, the part of the spare line 15 extended from the spare line gap 15*a* to the data-signal-line driving section 4 acts as the lead line for the temperature sensor 30 so that a signal from the temperature sensor 30 is transmitted to the data-signal-line driving section 4. However, the present invention is not limited to this, and the other part of the spare line 15 extended oppositely with respect to the data-signal-line driving section 4 may act as the lead line for the temperature sensor 30. In this case, each of those communication lines 16*a* located, with respect to the temperature sensor 30, oppositely to the data-signal-line driving section 4 has the communication line gap 16*a* (that is, each of those communication lines 16*a* not located toward the data-signal-line driving section 4 from the temperature sensor 30 is provided with the communication line gap 16*a*). In addition to this, the spare line gap 15*a* is so formed on the spare line 15 that the spare line gap 15*a* is located toward the data-signal-line driving section 4 with respect to the temperature sensor 30.

Further, it is preferable that temperature sensor 30 be located in a vicinity of the TFT 8 or at the like location. This is because a black matrix serving as a shielding member is provided (not shown), in order to make the TFT 8 unnoticeable from outside. Therefore, by locating the temperature sensor 30 below the black matrix, it is possible to make the temperature sensor 30 unnoticeable from the outside. It is particularly preferable that the temperature sensor 30 be in a vicinity of the data signal line 5 or the scan signal line 6. This is because the black matrix is provided above the data signal line 5 and the scan signal line 6.

Incidentally, the spare line 15 is originally for supplying the data signal in a case of breaking of the data signal line 5.

Therefore in the present embodiment, the spare line 15 no longer serve as the lead line for the temperature sensor 30 in the case of the breaking of the data signal line 5. More specifically, in the case of breaking of the data signal line 5, the spare line 15 is cut off in a vicinity of the data-signal-line driving section 4 by using a laser device so that the spare line 15 is disconnected from a later-described temperature measurement control section 40. In the meantime, one of the communication line 16 is short-circuited by using the laser device. In this way, it easily becomes possible to use the spare line 15 for its original function (of ensuring the supply of the data signal).

Next, a configuration of the thermal sensor 30 is described in detail.

In the present embodiment, the temperature sensor 30 is directly formed in some of the liquid crystal elements. For example, as illustrated in FIG. 4, the temperature sensor 30 includes aluminum (Al) electrodes 33a and 33b, an oxide film 31, and CrNi film 32. The aluminum (Al) electrodes 33a and 33b are formed with a space therebetween and located on the oxide film 31, and the CrNi film 32. The oxide film 31 is made of silicon dioxide ($SiO_2$). This temperature sensor 30 is a thermister type sensor which utilizes a phenomenon in which carrier concentration of a semiconductor changes exponentially in accordance with temperature. As such, the temperature sensor 30 measures the temperature by measuring resistance in the space between the aluminum electrodes 33a and 33b. It should be noted that the present embodiment adopts CrNi film 32, however the present invention is not limited to this, and the present invention may adopt an oxide semiconductor made of a transition metal such as manganese (Mn), nickel (Ni), Cobalt (Co) or the like.

Next described is a reason why the temperature sensor 30 is formed within the pixel of the liquid crystal display device 120 of the present embodiment.

Firstly, the liquid crystal display device 120 of the present embodiment is a very fine liquid crystal display device used for a computer. For displaying moving pictures or TV images, the very fine liquid crystal display device 120 has such a problem that its response speed is slow. Specifically, the liquid crystal, which is a capacitive load, holds an alignment status caused by application of a data signal voltage to the pixel electrode (holding characteristic). Therefore, unlike a CRT display, the liquid crystal display device can carry out the display without causing flickering. However, the response speed of the liquid crystal is slow. Particularly in relation to intermediate gradations, the response speed is not fast enough to respond within one-frame period of video input signal. This causes a problem such as occurrence of image sticking during the display of the moving pictures, thereby deteriorating the displaying quality.

In order to solve the foregoing problem, according to the overshoot method or the like a change greater than a change instructed by input data signals applied to the liquid crystal. In this way the response speed is improved.

In the liquid crystal display device 120, temperature within a display panel 2 is affected by environment temperature surrounding the display panel 2. This temperature becomes uneven over the display panel 2 during display operation. Accordingly, in order to improve the response speed, it is necessary to apply to the display panel 2 such a change that is, to an extent required by the temperature within the display panel 2, greater than the change instructed by the input data. Otherwise, it is impossible to attain appropriate improvement in the responding speed. The failure in improving the responding speed leads to display quality deterioration during the display of the moving pictures.

More specifically, in the overshoot method, as illustrated in FIG. 6(a), for example, a data signal voltage for obtaining a 50 grey level is applied so as to display 30 grey level at 25° C. As a result, it takes shorter time to reach 30 grey level compared with a case where a data signal voltage for obtaining 30 grey level is impressed.

Now, for example, it is assumed that as illustrated in FIG. 8(b), at 0° C., 30 grey level can be reached within 10 m seconds by applying the data signal voltage for obtaining 80 grey level. If the temperature of the liquid crystal element is falsely recognized as 10° C., it takes 15 m second to reach 30 grey level (see FIG. 6(c)). As a result, the response speed becomes insufficient for responding changes in the moving picture.

In view of that, it is necessary to more accurately correct the data signal voltage by monitoring the temperature, in order to improve the response speed. Particularly during the winter, low temperature causes slow response speed immediately after power is turned on.

Here in the actual display panel 2, changes in the temperature of the display panel 2 is observed as shown in FIG. 7(a) to FIG. 7(d). Increases in the temperature of the display panel 2 is attributed to heat transferred from a backlight (not shown) provided at a back of the display panel 2. More specifically, 30 min. after the power is turned on, the temperature distribution of the display panel 2 at surrounding temperature of 24° C. is as low as 32° C. rather evenly (see FIG. 7(a)). Then, 60 min. after the power is turned on, the temperature rises to 36.8° C. in approximate upper ⅘ of the display panel 2, while the temperature is 30.0° C. in approximate lower ⅕ of the display panel (see FIG. 7(b)). Note that the temperature in the upper portion of the display panel is higher than the lower portion of the display panel. This is because heat travels upwardly from the lower portion to higher portion. At 90 min. after the power is turned on, the temperature of the display panel 2 reaches a saturated state, and the temperature rises to 38.3° C. in approximate upper ⅘ of the display panel 2, and the temperature in approximate lower ⅕ of the display panel 2 stays 30.0° C. (see FIG. 7(c)). Further, the temperature distribution in the display panel 2 becomes almost the same as that shown in FIG. 7(a) again in 30 min time after the power is turned off if the power is turned of when the temperature distribution of the display panel 2 is as shown in FIG. 7(c).

As described, it takes 90 min. for the temperature to reach the saturated state. It should be noted that an initial surrounding temperature of the foregoing example is 24° C. If the initial surrounding temperature is lower, it is presumed that it will take longer to reach a saturation temperature, and that the saturation temperature will be lower than 38° C.

Further, the temperature of the display panel 2 changes more greatly in approximate upper ⅘ of the display panel 2. As a result, between 30 min. and 90 min. after the power is turned on, there is a clear difference in the temperature distributions. Accordingly, in the voltage application to the data signal line 5, the temperature change should be taken into consideration. It is particularly important to monitor the temperature in a case where the temperature is low.

For example, as shown in FIG. 13, the temperature sensors 30 are provided in plural positions in a vertical direction of the display panel 2 in accordance with a measurement result of the temperature distribution over the displaying area in the display panel 2. Further, the temperature sensors 30 are provided so that the thermal sensors 30 are arranged with shorter intervals in a lower area. As described, it is important to extract temperature data from a plurality of the scan signal lines 6 arranged in accordance with the measurement result of the temperature distribution. It is particularly preferable that many measurement points be provided in the lower area of the displaying area so that the temperature data of the lower area is sufficiently extracted.

As shown in FIG. 14, by arranging the thermal sensors 30 in the foregoing measurement points, detection signals from each of the thermal sensors 30 are transmitted via the spare wire 15 to a temperature measurement control section (temperature measurement control means) 40. Then, the temperature is measured by a temperature measuring section 41 provided in the temperature measurement control section 40. It should be noted that, in the present embodiment, the temperature measurement control section 40 may be positioned, for example, in an end portion of the data-signal-wire driving section 4.

More specifically, by impressing the power supply voltage to each of the temperature sensors 30, the temperature measuring section 41 calculates out the current values based on resistance values in the respective temperature sensors 30. Then, the temperatures of pixels are calculated by referring the current values to corresponding temperatures preliminary being measured.

Further, in the present embodiment, the temperature data extracted by the thermal sensors 30 is processed in a same manner as in the embodiment 2 and 3. Then the selection of the data generating section A to D is carried out. However, if there are sufficient measurement points, it is possible to presume that the temperatures of the liquid crystal around the scan signal lines 6 from which temperature data is extracted are substantially the same as the temperatures indicated by the respective temperature sensors 30.

Further, the data generating sections A to D for overshooting are selected, in accordance with the temperature indicated by the respective temperature sensors 30, on a line-by-line basis for the respective scan signal lines 6. This makes it no longer necessary to assign an address for each of the scan signal lines 6. Thus, unlike the foregoing embodiment 2, a large volume of memory is no longer needed. Since a selector (data generating section selecting means) 73 (FIG. 13) selects the data generating section for overshooting by referring the actual temperature indicated by the temperature sensors 30 to a Look Up Table shown in FIG. 15, it is possible to reduce the memory volume.

Further, in the foregoing method for driving the liquid crystal display device, it is possible to selectively use (switch over) the data generating sections on the line-by-line basis for the respective scan signal lines 6 independently.

As described, in a liquid crystal display device 120 and driving device 70 thereof according to the present embodiment as well as a method of the present embodiment for driving the liquid crystal display device 110, the data generating sections A through D are selectively used in accordance with temperatures of a display panel 2. Because the response speed is compensated for in accordance with actually measured temperatures of the liquid crystal, it is possible to accurately compensate the response speed for.

Further, in the present embodiment, the data generating sections A through D are selectively used in accordance with temperature information obtained by a temperature sensor 30. Therefore, it is possible to directly compensate the response speed for in accordance with the temperature information from the temperature sensor 30. This realizes further accurate compensation of the response speed.

Further, in a liquid crystal display device 120 and its driving device 70 of the present embodiment as well as a method of the present embodiment for driving the liquid crystal display device 120, the temperature sensors 30 are provided on a TFT (Thin Film Transistor) substrate of the display panel 2.

If the mounting of the temperature sensors 30 is carried out in a post-process (that is, after the substrate is formed), the temperature sensors 30 may not be so mounted that they are able to carry out an accurate temperature measurement. However, in the foregoing arrangement, the temperature sensors 30 are built in the TFT substrate. This enables the temperature sensors 30 to carry out the accurate temperature measurement.

Further, in the liquid crystal display device 120 of the present embodiment, a plurality of the temperature sensors 30 are provided in a direction perpendicular to a scanning direction of the display panel 2. In a case where the liquid crystal device 120 is set upright (that is, where the liquid crystals device 120 is so positioned that the direction perpendicular to its scanning direction is along its vertical direction), the temperature of the pixels changes in various transition patterns depending on a position of the pixel in a vertical direction. Therefore, by providing the temperature sensors 30 considering a situation of using the liquid crystal display device 120, it is possible to efficiently extract the temperature data.

Further, in the liquid crystal display device 120 of the present embodiment, temperature detection signals from each of the temperature sensors 30 are transmitted via spare lines 15 provided in the display panel 2. By using the spare lines 15 which are provided overall in the liquid crystal display device 120, it is no longer necessary to provide another particular line for transmitting the temperature detection signals from each of the temperature sensors 30. This is advantageous in costs, because a design of the display panel 2 does not have to be modified.

Further, in the liquid crystal display device 120 of the present embodiment, a selector (data generating section selecting means) 73 includes a Look Up Table showing which option of the data generating sections is to be selected for various temperatures in the display panel 2.

Therefore, in accordance with various temperatures in the display panel 2, the data generating sections A through D can be efficiently switched over on the line-by-line basis for the respective scan signal lines 6 independently.

Therefore, unlike overshooting carried out in a conventional liquid crystal display device, the driving device 70 of the liquid crystal display device 120 enables optimization of the overshooting on the line-by-line basis for the respective scan signal lines 6. Thus, response speed is corrected more suitably in accordance with characteristics of liquid crystal.

As a result, it is possible to provide the driving device 70 of the liquid crystal display device 120, in which the overshooting is optimized even if the temperatures get uneven within the displaying area.

In a driving device 70 of the present embodiment in a liquid crystal display device 120 as well as in a method of the present embodiment for driving the liquid crystal display device 120, a difference between an inputted video signal and the data signal outputted from the data generating section used for supplying the data signals to a lower area of the display panel 2 is greater than the difference between the inputted video signal and the data signals outputted from the data generating section used for supplying the data signals to a top and a middle areas of the display panel 2.

More specifically, in the lower area of the display panel 2, the temperature rises slower than the top and the middle areas of the display panel 2. Thus, it becomes possible to perform appropriate displaying in the lower area too by arranging such that the difference between the inputted video signal and the data signal outputted from the data generating section used for supplying the data signals to the lower area of the display panel 2 is greater than the difference between the inputted video signal and the data signals outputted from the data generating section used for supplying the data signals to the top and the middle areas of the display panel 2.

It should be noted that in the present embodiment, the temperature sensor 30 has a thermister configuration including CrNi film 32. This temperature sensor 30 is built in some of the pixels. However, the present invention is not limited to this and, for example, a widely available diode may be implanted in the pixel. With this diode, it is possible to detect the changes in the temperature based on output voltage varied in accordance with temperature characteristics of the diode.

Further, in the present embodiment, the spare line 15 is used as the lead line for the temperature sensor 30. However, the present invention is not limited to this, and it is possible to arrange an actual lead line, instead of using the spare line 15. Further, the spare lines 15 are arranged in the ladder-shape. However, the present invention is not limited to this, and it is possible to arrange the spare lines 15 in a shape other than the ladder-shape.

Further, in the present embodiment, transparent electrodes are provided on a first substrate and a second substrate. However, the present invention is not limited to this, and for example, it is possible to adopt the present invention to a configuration such as an IPS (In-Plane Switching), in which electrodes are provided only in one of substrates.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Further, it is possible to adopt a liquid crystal display device and its driving device of the present invention as well as the method of the present invention for driving the liquid crystal display device to, for example, a liquid crystal display device for use as a liquid crystal monitor in a super fine laptop computer, the liquid crystal monitor that can be used for displaying moving pictures. Further, it is possible to adopt the present invention to future products such as HDTV (High Definition Television).

What is claimed is:

1. A liquid crystal display device including a plurality of scan signal lines, a plurality of data signal lines to which video signals are supplied as data signals, and a displaying section including pixels arranged in a matrix manner, the pixels respectively connected, via switching sections, with the scan signal lines and the data signal lines corresponding to intersecting points thereof, the liquid crystal display device comprising:

a temperature sensor provided in at least one of the pixels in a displaying region of the displaying section;

a lead line provided unnoticeably in the displaying section, for transmitting a detection signal from the temperature sensor to a peripheral section of the displaying section;

a temperature measurement control section for measuring a temperature based on the detection signal transmitted from the temperature sensor;

a data signal line driving section for outputting the data signal to the data signal lines in a manner based on the temperature measured in the temperature measurement control section; and spare lines respectively corresponding to the data signal lines and branched to be connected with the data signal lines in such a manner that a ladder-like shape is formed with the spare lines and the data signal lines, the spare lines being for ensuring transmission of the data signal even if breaking occurs in a data signal line, the spare lines also functioning as the lead line.

2. A liquid crystal display device including a plurality of scan signal lines, a plurality of data signal lines to which video signals are supplied as data signals, and a displaying section including pixels arranged in a matrix manner, the pixels respectively connected, via switching sections, with the scan signal lines and the data signal lines corresponding to intersecting points thereof, the liquid crystal display device comprising:

a temperature sensor provided in at least one of the pixels in a displaying region of the displaying section;

a temperature measurement control section provided in a peripheral section of the displaying section, for measuring a pixel temperature based on the detection signal transmitted from the temperature sensor;

a lead line for transmitting a detection signal from the temperature sensor to the temperature measurement control section, the lead line unnoticeably provided in the displaying section;

data signal line driving section for outputting the data signal to the data signal lines in accordance with the temperature measured in the temperature measurement control section; and spare lines respectively corresponding to the data signal lines and branched to be connected with the data signal lines in such a manner that a ladder-like shape is formed with the spare lines and the data signal lines, the spare lines being for ensuring transmission of the data signal even if breaking occurs in a data signal line, the spare lines also functioning as the lead line.

3. The liquid crystal display device as set forth in claim 1, wherein the temperature sensor is a thermister type sensor that has been built in the pixels by carrying out film formation to form element films from which the temperature sensor is formed.

4. The liquid crystal display device as set forth in claim 1, wherein:

the data-signal-line driving section supplies, to a data signal line, a data signal voltage larger than a target data signal voltage that corresponds to a gradation value indicated by the video signal.

5. The liquid crystal display device as set forth in claim 1, wherein the temperature sensor is provided in a vicinity of a scan signal line or in a vicinity of a data signal line.

6. A liquid crystal display device including a plurality of scan signal lines, a plurality of data signal lines to which video signals are supplied as data signals, and a displaying section including pixels arranged in a matrix manner, the pixels respectively connected, via switching sections, with the scan signal lines and the data signal lines corresponding to intersecting points thereof, the liquid crystal display device comprising:

a temperature sensor provided in at least one of the pixels in a displaying region of the displaying section;

a lead line provided unnoticeably in the displaying section, for transmitting a detection signal from the temperature sensor to a peripheral section of the displaying section;

a temperature measurement control section for measuring a temperature based on the detection signal transmitted from the temperature sensor;

a data, signal line driving section for outputting the data signal to the data signal lines in a manner based on the temperature measured in the temperature measurement control section, wherein the temperature sensor is provided in a vicinity of a scan signal line or in a vicinity of a data signal line, and the temperature sensor is shielded by a shielding member.

7. A liquid crystal display device including a plurality of scan signal lines, a plurality of data signal lines to which video signals are supplied as data signals, and a displaying section including pixels arranged in a matrix manner, the pixels respectively connected, via switching sections, with the scan signal lines and the data signal lines corresponding to intersecting points thereof, the liquid crystal display device comprising:

a temperature sensor provided in at least one of the pixels in a displaying region of the displaying section;

a lead line provided unnoticeably in the displaying section, for transmitting a detection signal from the temperature sensor to a peripheral section of the displaying section;

a temperature measurement control section for measuring a temperature based on the detection signal transmitted from the temperature sensor;

a data signal line driving section for outputting the data signal to the data signal lines in a manner based on the temperature measured in the temperature measurement control section;

a plurality of temperature sensors are provided in the pixels only in an area excluding a top H/4 of the displaying region and a bottom H/4 of the displaying region, where H is a height of the displaying region; and the temperature is an average of a plurality of the detection signals transmitted from the plurality of the temperature sensor, the average calculated by the temperature measurement control section.

8. The liquid crystal display device as set forth in claim 7, wherein:

the plurality of the temperature sensor are dispersed 2-dimensionally over displaying area; and the plurality of the temperature sensor are provided at substantially equal intervals in a horizontal direction of the displaying area.

9. The liquid crystal display device as set forth in claim 7, wherein the data signal lines are arranged at substantially equal intervals in that part of the display region which includes positions of the temperature sensors.

10. The liquid crystal display device as set forth in claim 7, wherein the plurality of the temperature sensor are arranged at substantially equal intervals in a vertical direction of the displaying area.

11. The liquid crystal display device as set forth in claim 8, wherein the plurality of the temperature sensor are arranged at substantially equal intervals in a vertical direction of the displaying area.

12. The liquid crystal display device as set forth in claim 9, wherein the plurality of the temperature sensor are arranged at substantially equal intervals in a vertical direction of the displaying area.

13. A method for driving a liquid crystal display device including a plurality of scan signal lines, a plurality of data signal lines to which video signals are supplied as data signals, and a displaying section including pixels arranged in a matrix manner, the pixels respectively connected, via switching sections, with the scan signal lines and the data signal lines corresponding to intersecting points thereof, the method comprising the steps of:

(I) measuring temperature based on a detection signal transmitted from a temperature sensor to a periphery of the displaying section via a lead wire buried in the displaying section, the temperature sensor provided in at least one of the pixels in a displaying area of the displaying section;

(II) driving the data signal lines by supplying the data signals to the data signal lines in accordance with the temperature of the pixels measured in the (I); and (III) ensuring transmission of the data signal even if breaking occurs in a data signal line with spare lines respectively corresponding to the data signal lines and branched to be connected with the data signal lines in such a manner that a ladder-like shape is formed with the spare lines and the data signal lines, wherein the spare lines function as the lead wire.

* * * * *